United States Patent
Uchiyama et al.

(10) Patent No.: US 7,911,448 B2
(45) Date of Patent: Mar. 22, 2011

(54) POINTING DEVICE AND RECEIVING UNIT WITH UWB SIGNAL

(75) Inventors: Takuya Uchiyama, Shinagawa (JP); Masahiro Yanagi, Shinagawa (JP); Shigemi Kurashima, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 1384 days.

(21) Appl. No.: 10/965,929

(22) Filed: Oct. 18, 2004

(65) Prior Publication Data

US 2005/0170778 A1    Aug. 4, 2005

(30) Foreign Application Priority Data

Oct. 17, 2003  (JP) ................ 2003-357645

(51) Int. Cl.
*G06F 3/033* (2006.01)
(52) U.S. Cl. .................... 345/163; 345/158
(58) Field of Classification Search .......... 345/642, 345/156–167; 342/386; 370/466
See application file for complete search history.

(56) References Cited

U.S. PATENT DOCUMENTS

| | | | | |
|---|---|---|---|---|
| 4,988,981 A * | 1/1991 | Zimmerman et al. | ........ | 345/158 |
| 5,661,490 A * | 8/1997 | McEwan | ........ | 342/386 |
| 6,473,070 B2 * | 10/2002 | Mishra et al. | ........ | 345/158 |
| 6,504,526 B1 * | 1/2003 | Mauritz | ........ | 345/158 |
| 7,301,530 B2 * | 11/2007 | Lee et al. | ........ | 345/158 |
| 2002/0057254 A1 * | 5/2002 | Kurashima et al. | ........ | 345/156 |
| 2003/0081630 A1 * | 5/2003 | Mowery et al. | ........ | 370/466 |
| 2007/0070358 A1 | 3/2007 | Ouchi | | |

FOREIGN PATENT DOCUMENTS

| | | | |
|---|---|---|---|
| JP | 05119914 A | * | 5/1993 |
| JP | 7-5979 | | 1/1995 |
| JP | 9-218742 | | 8/1997 |
| JP | 2005-078303 | | 3/2005 |

OTHER PUBLICATIONS

Japanese Office Action issued on Nov. 4, 2008 in corresponding Japanese Patent Application No. 2003-357645.

* cited by examiner

*Primary Examiner* — Chanh Nguyen
*Assistant Examiner* — Adam J Snyder
(74) *Attorney, Agent, or Firm* — Staas & Halsey LLP

(57) ABSTRACT

A small-sized and lightweight pointing device and receiving unit reduce power consumption. The receiving unit transmits UWB (Ultra Wide Band) signals simultaneously from an antenna thereof. The pointing device receives the transmitted UWB signals with three antennas thereof. The respective timings when the transmitted UWB signals are received with the three antennas depend on the distances between the transmitting antenna and the three receiving antennas. With this principle, propagation distances from the transmitting antenna to the three receiving antennas are real distances between the transmitting antenna and the three receiving antennas. By applying the principle of triangular surveying to the distances, position coordinates of the pointing device to the receiving unit can be specified. Amount of movement made by the pointing device is calculated based on a change in the position coordinates.

3 Claims, 25 Drawing Sheets

COORDINATE INPUT DEVICE 100

COORDINATE INPUT DEVICE 200

POINTING DEVICE AND RECEIVING UNIT WITH UWB SIGNAL

BACKGROUND OF THE INVENTION

1. Field of the Invention

This invention generally relates to a pointing device and receiving unit, and more particularly, to a pointing device and receiving unit that utilize an Ultra Wide Band (hereinafter simply referred to as UWB) signal.

2. Description of the Related Art

FIG. 1 shows a conventional coordinate input device. With reference to FIG. 1, the coordinate input device includes a pointing device 910 and a receiving unit 920. The pointing device 910 is operated by users. The receiving unit 920 receives information transmitted from the pointing device 910. The pointing device 910 and the receiving unit 920 send and receive data by wireless with frequencies of several gigahertz.

The pointing device 910 is a mouse or a pen-type coordinate input device, for example. The pointing device 910 includes an antenna 911, an RF unit 912, a control unit 913, a switch unit 914, a sensor unit 915, and a power unit 916. The power unit 916 includes a dry battery or the like so as to provide each unit with electricity. The switch unit 914 is an input device such as a click button, a wheel button, or the like. The sensor unit 915 is a ball-type or optical input device for inputting an amount of movement. Information on an operation is inputted into the switch unit 914 and information on the amount of movement is inputted into the sensor unit 915. Those inputted pieces of information are inputted into the control unit 913. Particularly, the information on the amount of movement inputted from the sensor unit 915 is inputted into a coordinate detection unit 913a, which is included in the control unit 913. The information on the amount of movement is composed of analog signals. The coordinate detection unit 913a calculates information on X-coordinate and Y-coordinate with the inputted analog signals. After the information on the operation and the information on the coordinates are processed in the control unit 913 in a certain manner, the information on the operation and the information on the coordinates are inputted into the RF unit 912 as a data signal. In the RF unit 912, the inputted data signal is converted into a frequency signal, and the frequency signal is transmitted from the antenna 911.

The receiving unit 920 includes an antenna 921, an RF unit 922, a control unit 923, and an interface unit 924. The frequency signal received by the antenna 921 is inputted into the RF unit 921, and is converted into a data signal. After the data signal is inputted into the control unit 923, the data signal is outputted into a personal computer or the like from the interface control unit 924. The interface unit 924 is a USB (Universal Serial Bus), a PS/2 mouse, an IEEE1394 interface component, or the like.

However, in the above-mentioned architecture, the sensor unit 915 includes a ball-type or an optical unit. Therefore, there is the problem in that the pointing device 910 becomes heavy, and the user-friendliness is degraded. In the case where the optical unit is employed, there is the problem in that the power consumption is increased and the dry battery having a larger capacity is required in the power unit 916 in order to supply more electricity. This problem results in an increase in weight of the entire pointing device 910.

Under the circumstances, some coordinate input devices have been proposed. The proposed coordinate input devices do not require the above-mentioned sensor unit 915. For example, Japanese Laid-Open Patent Application Publication No. 9-218742 discloses a pen-type coordinate input device that detects coordinates of the pen tip position with the use of electric waves. More specifically, the above-mentioned pen-type coordinate input device is equipped with an antenna in the close vicinity of the pen tip. The electric waves transmitted from this antenna are received by two antennas installed in an information processing unit. With the use of signals received by those two antennas, the information processing unit specifies the coordinate position of the transmitting antenna in the close vicinity of the pen tip, based on the principle of triangular surveying.

Japanese Laid-Open Patent Application Publication No. 7-5979 discloses a coordinate input device that detects the coordinates of the pen tip position with the use of laser beams. More specifically, a reflector such as aluminum tape or the like is attached to the tip of an ordinary writing material such as a pen, a ballpoint pen, or the like. With the use of the laser beams, the coordinate input device scans the reflector from two directions. The coordinate input device detects the coordinates of the pen tip position based on angles of two beam paths when the reflector is detected.

However, the above-mentioned coordinate input device disclosed in Japanese Laid-Open Patent Application Publication No. 9-218742 requires two different transmission systems: one transmission system for transmitting the information on operation and the other transmission system for transmitting the information on coordinates. Therefore, there is the problem in that the power consumption is increased. Consequently, a battery having a large capacity needs to be mounted on the pen-type coordinate input device. As a result, the increased weight lowers the user-friendliness.

The above-mentioned coordinate input device disclosed in Japanese Laid-Open Patent Application Publication No. 7-5979 requires a mirror or the like in order to scan or detect laser sources and laser beam paths. As a result, the entire system becomes complicated and larger in size.

SUMMARY OF THE INVENTION

The present invention has been made in view of the above circumstances and provides a small-sized, lightweight, and less power consumed pointing device and receiving unit.

According to an aspect of the present invention, a pointing device including a first unit (a communication unit, an RF unit) that communicates with a receiving unit with a UWB (Ultra Wide Band) signal, a second unit (a position coordinate calculation unit) that specifies position coordinates of the pointing device to the receiving unit with the UWB signal, and a third unit (an amount-of-movement calculation unit) that calculates an amount of movement of the pointing device, based on the position coordinates specified by the second unit. The UWB employs a method of transmitting a baseband signal without change, and does not require a circuit used for typical superheterodyne method such as a voltage controlled oscillator for generating high frequencies, a frequency synthesizer, a mixer, a filter for intermediate frequencies, or the like. An electronic circuit utilizing the UWB signal is allowed to be smaller in size, and power consumption is further reduced. The UWB signal is a spread spectrum modulated signal, which enables to calculate a propagation distance of the signal and calculate position coordinates of the pointing device. It is thus calculate the amount of movement made by the pointing device.

According to another aspect of the present invention, a pointing device including a first unit (a communication unit, an RF unit) that communicates with a receiving unit with UWB (Ultra Wide Band) signals, a plurality of antennas that receive UWB signals regularly transmitted from the receiving unit, a second unit (a reception timing specification unit) that specifies reception timings of the UWB signals on an antenna basis, a third unit (a transmission timing specification unit) that specifies transmission timings of the UWB signals, a fourth unit (a propagation distance calculation unit) that calculates propagation distances of the UWB signals, based on the reception timings and the transmission timings, a fifth unit (a position coordinate calculation unit) that calculates position coordinates of the pointing device to the receiving unit with the propagation distances, based on the principle of triangular surveying, and a sixth unit (an amount-of-movement calculation unit) that calculates an amount of movement of the pointing device, based on a difference between the position coordinates calculated last time and the position coordinates calculated this time. An electronic circuit utilizing the UWB signal is allowed to be smaller in size, and power consumption is further reduced. The UWB signal is a spread spectrum modulated signal, which enables to specify the transmission timing and the reception timing so as to calculate a propagation distance of the UWB signal. In addition, by installing a plurality of antennas in the pointing device, the distances between the antennas and the receiving unit are calculated respectively. With three distances, the position coordinates of the pointing device are calculated based on the triangular surveying. Thus, a change in the position coordinates enables to calculate the amount of movement made by the pointing device.

According to another aspect of the present invention, a pointing device including a first unit (a communication unit, an RF unit) that communicates with a receiving unit with UWB (Ultra Wide Band) signals, an antenna that receives UWB signals regularly transmitted from the receiving unit, a second unit (a reception timing specification unit) that specifies reception timings on a UWB signal basis, a third unit (a transmission timing specification unit) that specifies transmission timings of the UWB signals, a fourth unit (a propagation distance calculation unit) that calculates propagation distances of the UWB signals, based on the reception timings and the transmission timings, a fifth unit (a position coordinate calculation unit) that calculates position coordinates of the pointing device to the receiving unit with the propagation distances, based on the principle of triangular surveying, and a sixth unit (an amount-of-movement calculation unit) that calculates an amount of movement of the pointing device, based on a difference between the position coordinates calculated last time and the position coordinates calculated this time. A plurality of antennas can be installed in the receiving unit instead of being installed in the pointing device. Resultant effects are the same as above-mentioned another aspect.

According to another aspect of the present invention, a pointing device including a first unit (a communication unit, an RF unit) that communicates with a receiving unit with a UWB (Ultra Wide Band) signal, an antenna, a second unit (an antenna drive unit) that swings the antenna in a cycle, a third unit (an UWB signal transmission unit) that regularly transmits the UWB signal via the antenna, a fourth unit (an UWB signal reception unit) that receives the UWB signal reflected by the receiving unit, a fifth unit (an antenna angle specification unit) that specifies a swing angle of the antenna when the UWB signal is received, a sixth unit (a time measurement unit) that measures a time from a timing when the UWB signal is transmitted to a timing when a reflected wave of the UWB signal is received, a seventh unit (a propagation distance calculation unit) that calculates a propagation distance of the UWB signal, based on the time measured by the sixth unit, an eighth unit (a position coordinate calculation unit) that calculates position coordinates of the pointing device to the receiving unit, based on the propagation distance and the swing angle, and a ninth unit (an amount-of-movement calculation unit) that calculates an amount of movement of the pointing device, based on a difference between the position coordinates calculated last time and the position coordinates calculated this time. An electronic circuit utilizing the UWB signal is allowed to be smaller in size, and power consumption is further reduced. The UWB signal is a spread spectrum modulated signal, which enables to specify the transmission timing and the reception timing so as to calculate a propagation distance of the UWB signal. A directional antenna is installed in the pointing device. By swinging the directional antenna, the propagation distance is detected. It is thus calculate the position coordinates of the receiving unit to the pointing device. A change in the position coordinates enables to calculate the amount of movement made by the pointing device.

According to another aspect of the present invention, a receiving unit including a first unit (a communication unit, an RF unit) that communicates with a pointing device with a UWB (Ultra Wide Band) signal, a second unit (a position coordinate specification unit) that specifies position coordinates of the pointing device to the receiving unit with the UWB signal, and a third unit (an-amount-of-movement calculation unit) that calculates an amount of movement of the pointing device, based on the position coordinates specified by the second unit. An electronic circuit utilizing the UWB signal is allowed to be smaller in size, and power consumption is further reduced. The UWB signal is a spread spectrum modulated signal, which enables to calculate a propagation distance of the signal and calculate position coordinates of the pointing device. It is thus calculate the amount of movement made by the pointing device.

According to another aspect of the present invention, a receiving unit including a first unit (a communication unit, an RF unit) that communicates with a pointing device with UWB (Ultra Wide Band) signals, a plurality of antennas that receive UWB signals regularly transmitted from the pointing device, a second unit (a reception timing specification unit) that specifies reception timings of the UWB signals on an antenna basis, a third unit (a transmission timing specification unit) that specifies transmission timings of the UWB signals, a fourth unit (a propagation distance calculation unit) that calculates propagation distances of the UWB signals, based on the reception timings and the transmission timings, a fifth unit (a position coordinate calculation unit) that calculates position coordinates of the pointing device to the receiving unit with the propagation distances, based on the principle of triangular surveying, and a sixth unit (an amount-of-movement calculation unit) that calculates an amount of movement of the pointing device, based on a difference between the position coordinates calculated last time and the position coordinates calculated this time. An electronic circuit utilizing the UWB signal is allowed to be smaller in size, and power consumption is further reduced. The UWB signal is a spread spectrum modulated signal, which enables to specify the transmission timing and the reception timing so as to calculate a propagation distance of the UWB signal. In addition, by installing a plurality of antennas in the receiving unit, the distances between the antennas and the pointing device are calculated respectively. With three distances, the position coordinates of the pointing device are calculated based on the triangular surveying. Thus, a change in the position coordinates enables to calculate the amount of movement made by the pointing device.

According to another aspect of the present invention, a receiving unit comprising, a first unit (a communication unit, an RF unit) that communicates with a pointing device with UWB (Ultra Wide Band) signals, an antenna that receives UWB signals regularly transmitted from the pointing device, a second unit (a reception timing specification unit) that specifies reception timings of each of the UWB signals, a third unit (a transmission timing specification unit) that specifies transmission timings of the UWB signals, a fourth unit (a propagation distance calculation unit) that calculates propagation distances of the UWB signals, based on the reception timings and the transmission timings, a fifth unit (a position coordinate calculation unit) that calculates position coordinates of the pointing device to the receiving unit with the propagation distances, based on the principle of triangular surveying, and a sixth unit (an amount-of-movement calculation unit) that calculates an amount of movement of the pointing device, based on a difference between the position coordinates calculated last time and the position coordinates calculated this time. A plurality of antennas can be installed in the pointing device instead of being installed in the receiving unit.

According to another aspect of the present invention, a receiving unit comprising, a first unit (a communication unit, an RF unit) that communicates with a pointing device with a UWB (Ultra Wide Band) signal, an antenna, a second unit (a reception timing specification unit) that swings the antenna in a cycle, a third unit (a transmission timing specification unit) that regularly transmits the UWB signal from the antenna, a fourth unit (an UWB signal reception unit) that receives the UWB signal reflected by the pointing device, a fifth unit (an antenna angle specification unit) that specifies a swing angle of the antenna when the UWB signal is received, a sixth unit (a reception timing specification unit) that specifies a reception timing of the UWB signal, a seventh unit (a transmission specification unit) that specifies a transmission timing of the UWB signal, an eighth unit (a propagation distance calculation unit) that calculates a propagation distance of the UWB signal, based on the reception timing and the transmission timing, a ninth unit (a position coordinate calculation unit) that calculates position coordinates of the pointing device to the receiving unit, based on the propagation distance and the swing angle, and a tenth unit (an amount-of-movement calculation unit) that calculates an amount of movement of the pointing device, based on a difference between the position coordinates calculated last time and the position coordinates calculated this time. An electronic circuit utilizing the UWB signal is allowed to be smaller in size, and power consumption is further reduced. The UWB signal is a spread spectrum modulated signal, which enables to specify the transmission timing and the reception timing so as to calculate a propagation distance of the UWB signal. A directional antenna is installed in the receiving unit. By swinging the directional antenna, the propagation distance is detected. It is thus calculate the position coordinates of the pointing device to the receiving unit. A change in the position coordinates enables to calculate the amount of movement made by the pointing device.

According to another aspect of the present invention, a pointing device comprising, a first unit (a communication unit, an RF unit) that communicates with a receiving unit with UWB (Ultra Wide Band) signals, an antenna that receives UWB signals regularly transmitted from receiving units, a second unit (a reception timing specification unit) that specifies reception timings of the USB signals on a UWB signal basis, a third unit (a transmission timing specification unit) that specifies transmission timings of the UWB signals, a fourth unit (a propagation distance calculation unit) that calculates propagation distances of the UWB signals, based on the reception timings and the transmission timings, a fifth unit (a position coordinate calculation unit) that calculates position coordinates of the pointing device to the receiving units with the use of the propagation distances, based on the principle of triangular surveying, and a sixth unit (an amount-of-movement calculation unit) that calculates an amount of movement of the pointing device, based on a difference between the position coordinates calculated last time and the position coordinates calculated this time. An electronic circuit utilizing the UWB signal is allowed to be smaller in size, and power consumption is further reduced. The UWB signal is a spread spectrum modulated signal, which enables to specify the transmission timing and the reception timing so as to calculate a propagation distance of the UWB signal. In addition, by installing antennas so that the pointing device can receive the UWB signals from the antennas, the distances between the antennas and the pointing device are calculated respectively. With three distances, the position coordinates of the pointing device are calculated based on the triangular surveying. Thus, a change in the position coordinates enables to calculate the amount of movement made by the pointing device.

BRIEF DESCRIPTION OF THE DRAWINGS

Embodiments of the present invention will be described in detail based on the following figures, wherein.

DESCRIPTION OF THE PREFERRED EMBODIMENTS

The following is a description of embodiments of the present invention, with reference to the accompanying drawings.

Figure 1:
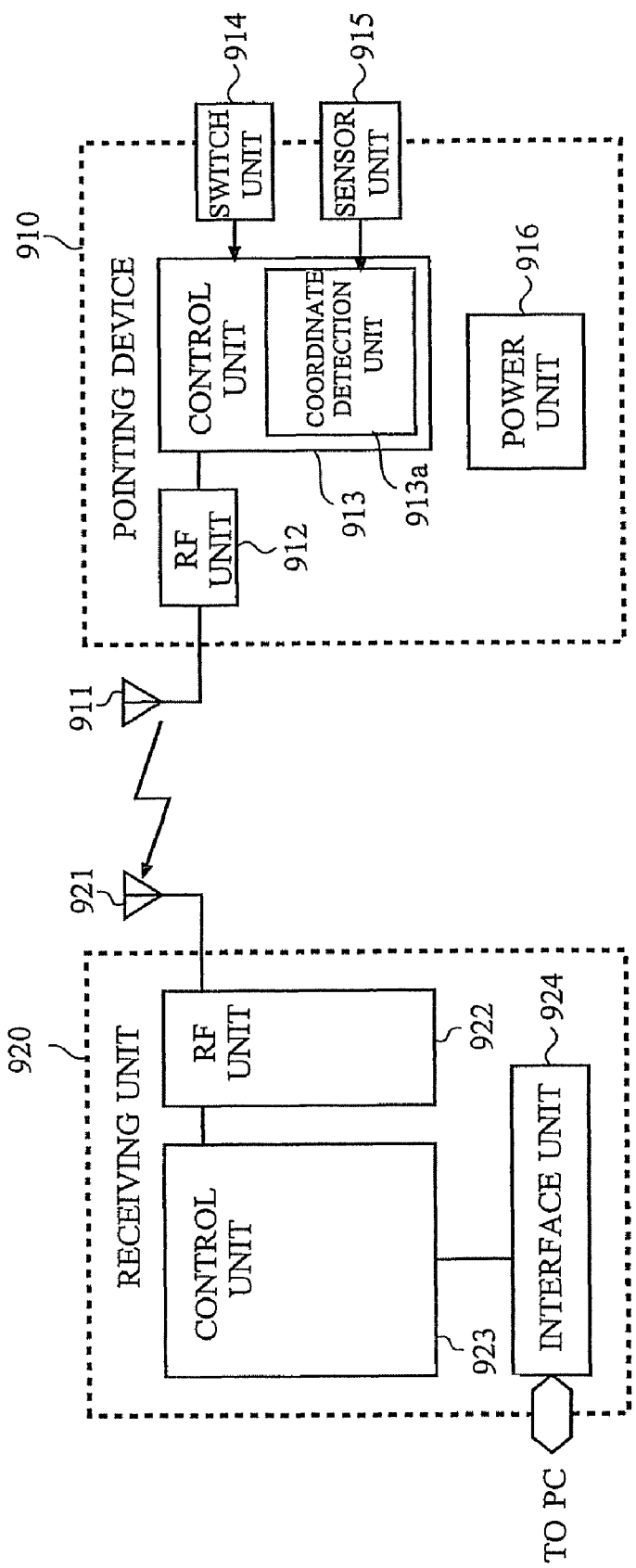
FIG. 1 is a top view illustrating a coordinate input device 900 used for a conventional technology.
Figure 2:
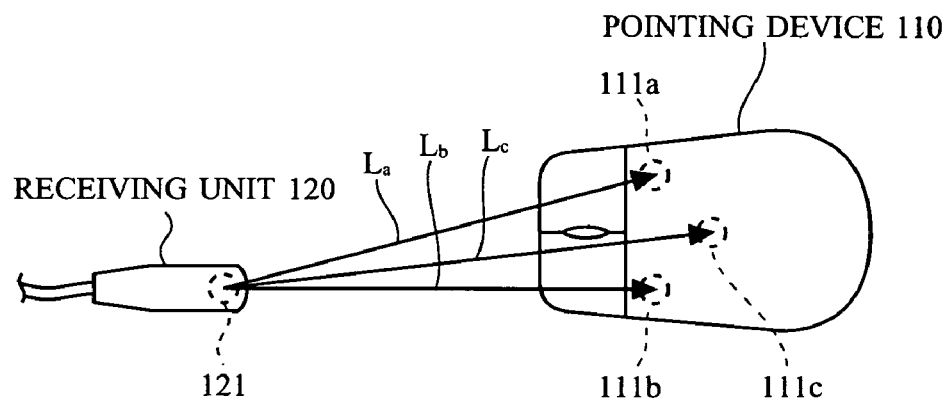
FIG. 2 is a top view illustrating a coordinate input device 100 in accordance with a first embodiment of the present invention.

A first embodiment of the present invention will be described in detail, with reference to the accompanying drawings. FIG. 2 is a top view illustrating a coordinate input device 100 in accordance with the first embodiment of the present invention. Referring to FIG. 2, the coordinate input device 100 includes a pointing device 110 and a receiving unit 120. The pointing device 110 and the receiving unit 120 send and receive data with the use of a UWB signal.

Figure 3:
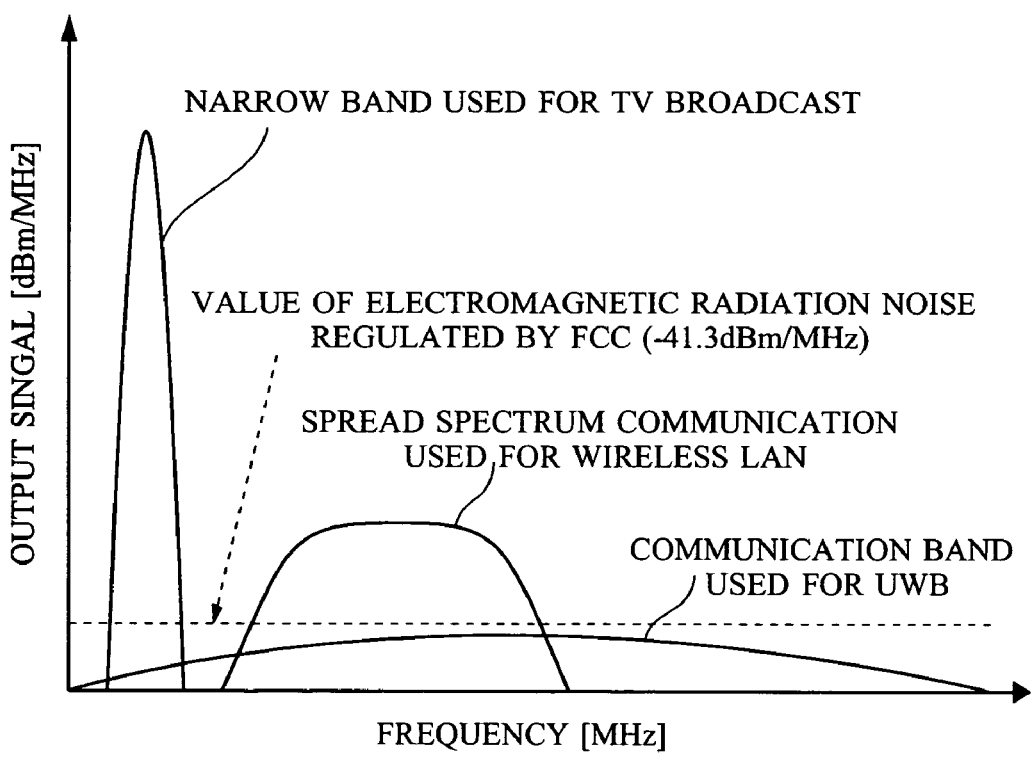
FIG. 3 is a graph showing a comparison of communication bands: the narrow communication band used for TV or radio broadcasting, the spread spectrum communication used for wireless LAN or the like, and UWB.

Here, a description will now be given of features of UWB. UWB is a communication technology for transferring data over a wide range of frequencies (greater than 1.5 gigahertz and a relative bandwidth greater than 25 percent), compared with the narrow communication band used for TV or radio broadcasting, spread spectrum communication used for wireless LAN (Local Area Network) or the like. FIG. 3 is a graph showing a comparison of communication bands: the narrow communication band used for TV or radio broadcasting, the spread spectrum communication used for wireless LAN, and UWB.

Referring to FIG. 3, the communication band used for UWB is extremely broader than those used for TV broadcasting and wireless LAN. UWB with this wide range of frequencies employs a spread spectrum communication method so as to dissipate very short-pulse signals in a wide range of frequencies, and enables carrier-free transmission and an extremely low transmission output. The Federal Communications Commission (FCC) regulates electromagnetic radiation noise at −41.3 dBm/MHz as shown as a dotted line in FIG. 3. UWB allows a communication under this regulated value. In other words, it is possible to communicate by using the transmission output to be considered noises for the data communication such as TV broadcasting or wireless LAN. The UWB technology suggests that the UWB communication is capable of sharing the same frequency with other communication methods. The UWB communication also suggests that the power consumption can be reduced, compared with other communication methods.

As another feature of UWB, it is possible to perform a high-speed communication over 100 Mbps. As described above, this high-speed communication can be achieved by utilizing the wide range of frequencies. In addition, it is also possible to perform communication at a relatively low power; therefore, compared with the conventional wireless LAN or the like, the transmission distance can remarkably be extended.

Further, UWB has yet another feature that allows to simplify transmitting and receiving circuitries. That is, UWB does not require a VCO (Voltage Controlled Oscillator) for generating very high carrier frequencies for super heterodyne method, or does not require a circuit such as a frequency synthesizer, a mixer, a filter for intermediate frequencies, or the like, since UWB employs a transmission method that transmits the base band signals without change. Thus, the circuit can be downsized and the power consumption can be further reduced.

Figure 4A:
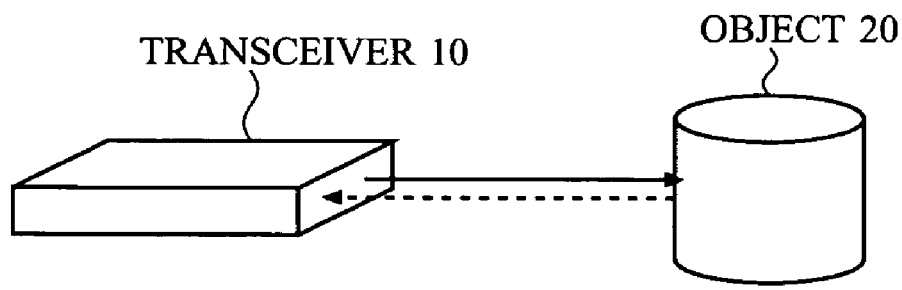
FIG. 4A illustrates the radar capability of the UWB.
Figure 4B:
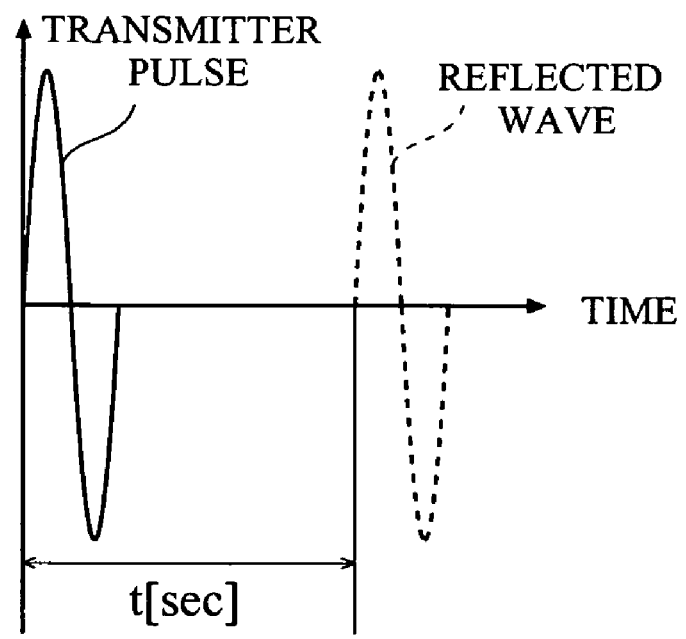
FIG. 4B illustrates a timing when a transmitter pulse transmitted from a transceiver 10 is reflected on the surface of an object 20 and is received by the transceiver 10.

In addition to the above-mentioned features, UWB has another capability of distance survey (also called radar capability). Referring to FIGS. 4A and 4B, a description will be given of this radar capability. In FIG. 4A, a transceiver 10 is a communication device leveraging UWB signals. An object 20 reflects a transmitter pulse applied from the transceiver 10.

The transmitter pulse applied from the transceiver 10 is reflected on the surface of the object 20, and is received by the transceiver 10 as a reflected wave (shown in FIG. 4B). A UWB signal is an extremely short wave in one nanosecond duration, and the transceiver 10 is capable of measuring a reception timing of the reflected wave to an accuracy of picosecond. The reception timing is equivalent to a delay time (t) from the time when the transmitter pulse is transmitted to the time when the reflected wave is received. Several picoseconds duration is short enough to transfer the wave pulse. By converting the delay time (t) into a distance, it is thus possible to calculate the distance to the object 20 accurately.

UWB includes dozens of low frequencies having high transmissions through an object; therefore, UWB can be utilized for a through-the-wall sensor that is able to detect the opposite side of a wall.

The present invention leverages the above-mentioned features of UWB. Thus, in the present invention, the coordinate input device 100 having a high accuracy is realized. The coordinate input device 100 also allows cost reduction and lightweight due to the reduced the power consumption and the smaller circuit size. By utilizing UWB, the coordinate input device 100 does not have any limitations on the installation location.

Referring back to FIG. 2, the pointing device 110 receives the UWB signals with three antennas 111a, 111b, and 111c. The UWB signals are transmitted from the antenna 121 of the receiving unit 120. The timings when the antennas 111a, 111b, and 111c receive the UWB signals transmitted from the antenna 121 depends on distances La, Lb, and Lc from the antenna 121 to the antennas 111a, 111b, and 111c (The above-mentioned timing is referred to as a reception timing). In the first embodiment of the present invention, by utilizing the above-mentioned principle, the distances La, Lb, and Lc between the antenna 121 and the antennas 111a, 111b, and 111c are calculated respectively. The distances La, Lb, and Lc are propagation distances of the UWB signals. Then, the principle of triangular surveying is applied to the propagation distances so as to specify position coordinates (x, y) of the pointing device 110 to the receiving unit 120. Now, referring to the drawings, a description will be given of the entire system and architecture of the first embodiment. In the description of the first embodiment, the receiving unit 120 (particularly, the antenna 121) is set to origins (0, 0).

Figure 5:
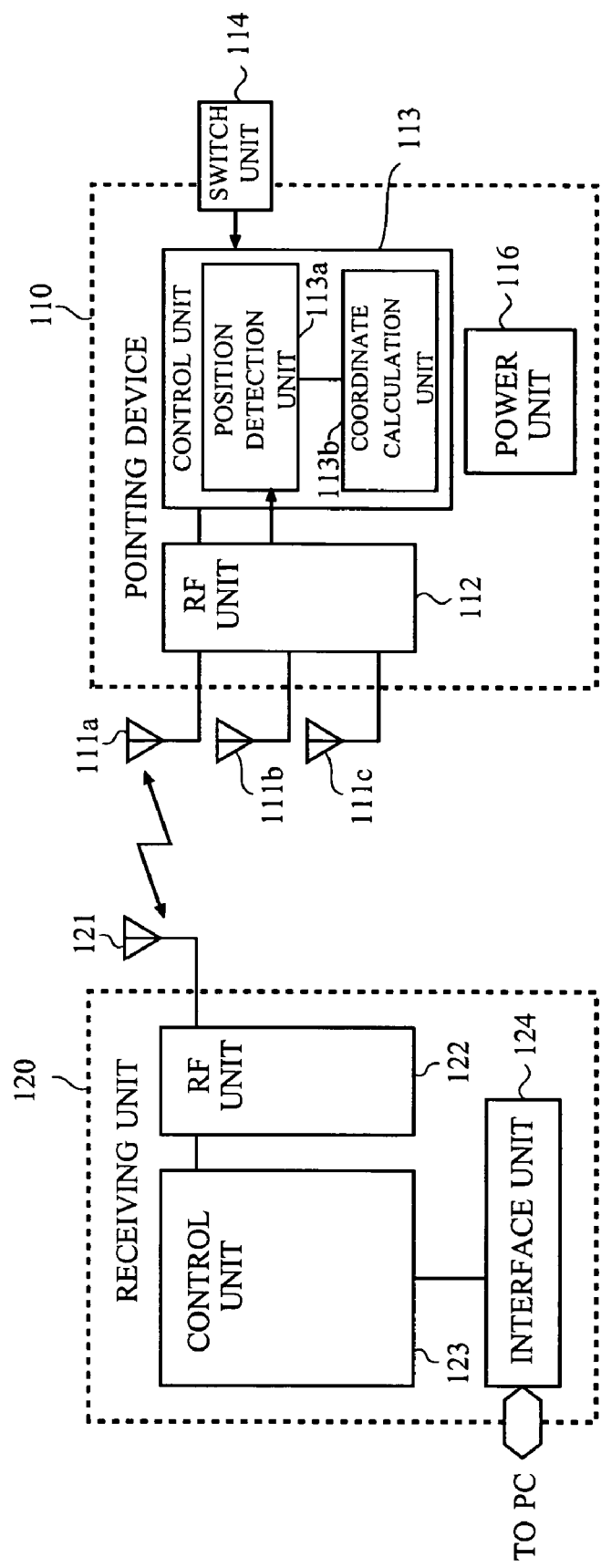
FIG. 5 is a block diagram showing system architecture of a pointing device 110 and a receiving unit 120 in the first embodiment.

FIG. 5 is a block diagram showing system architecture of a pointing device 110 and a receiving unit 120 in the first embodiment. In FIG. 5, the pointing device 110 is a mouse or a pen-type coordinate input device, for example. The pointing device 110 includes three antennas 111a, 111b, and 111c, an RF unit 112, a control unit 113, a switch unit 114, and a power unit 116. The power unit 116 includes a dry battery or the like so as to provide each unit with electricity. The switch unit 114 is an input device such as a click button, a wheel button, or the like. Operation information inputted from the switch unit 114 is inputted into the control unit 113. The control unit 113 performs a given process on the operation information, and inputs the operation information into the RF unit 112 as a data signal. The RF 112 spread spectrum modulates the data signal with a preset spread spectrum code, and transmits this base band signal without change from each of the antennas 111a, 111b, and 111c as a UWB signal. The RF unit 112 functions as a communication unit.

The receiving unit 120 includes an antenna 121, an RF unit 122, a control unit 123, and an interface unit 124. The UWB signal received by the antenna 121 is inputted into the RF unit 121, and is converted into a data signal. The RF unit 122 spread spectrum demodulates the inputted UWB signal with a given spread spectrum code so as to obtain the original data signal. The original data signal is inputted into the control unit 123, a given process is carried out, and the signal is outputted to a PC from the interface unit 124. The interface unit 124 is a USB (Universal Serial Bus), a PS/2 mouse, an IEEE1394 interface component, or the like. The RF unit 122 functions as a communication unit.

The receiving unit 120 transmits signals for distance measurement from the antenna 121 regularly (for example once every 30 milliseconds). The signals for distance measurement are the UWB signals that have been spread spectrum modulated with the spread spectrum code. The pointing device 110 receives these signals for distance measurement with three antennas 111a, 111b, and 111c. The received signals for distance measurement are inputted into the RF unit 112, and are spread spectrum demodulated with the spread spectrum code generated at respective reception timings. By comparing the timing when the signal for distance measurement is transmitted from the antenna 121 (transmission timing) with the reception timing, calculated is the propagation time of the signal for distance measurement to reach the antennas 111a, 111b, and 111c. Also, the distances La, Lb, and Lc are calculated when each propagation time is multiplied by a propagation speed of an electric wave. A description will now be given of the distance measurement.

When the RF unit 112 receives the signal for distance measurement, the RF unit 112 generates the spread spectrum code, and spread spectrum demodulates the signal for distance measurement. The spread spectrum demodulated signal for distance measurement is inputted into the control unit 113. The RF unit 112 inputs the timing (phase) when the spread spectrum code was generated, into a position detection unit 113a of the control unit 113 as a reception timing. In other words, the RF unit 112 functions as a means for specifying the reception timing. Also, the RF unit 112 functions as a communication unit.

Then, the control unit 113, into which the demodulated signal for distance measurement is inputted, specifies the transmission timing with the signal for distance measurement. In other words, the control unit 113 functions as a means for specifying the transmission timing. The transmission timing is the timing (phase) when the receiving unit 120 generated the spread spectrum code. The receiving unit 120 transmits the signal for distance measurement including the timing (phase) when the receiving unit 120 generated the spread spectrum code. Thus, the control unit 113 is capable of specifying the transmission timing by extracting the above-mentioned timing from the inputted signal for distance measurement. Then, the specified transmission timing is inputted into the position detection unit 113a.

The transmission timing and the three reception timings are inputted into the position detection unit 113a. The position detection unit 113a calculates the propagation times to the antennas 111a, 111b, and 111c respectively by comparing the reception timing and the transmission timing. The distances La, Lb, and Lc are the propagation times multiplied by the propagation speed. That is, the position detection unit 113a functions as a means for calculating the propagation distance of the signal for distance measurement. However, in the case where there is a timing gap between the receiving unit 120 and the pointing device 110 (which is referred to as an offset time), the accurate propagation time cannot be specified, since the offset time is included in the transmission timing. So the receiving unit 120 is required to synchronize the time with the pointing device 110 when activated.

Thus, the distances La, Lb, and Lc are measured. The position detection unit 113a calculates the position coordinates of the receiving unit 120 to the pointing device 110 with the principle of the triangular surveying. Then, the position detection unit 113a calculates back the position coordinates (x, y) of the pointing device 110 with the position coordinates of the receiving unit 120. That is, the position detection unit 113a functions as a means for calculating the position coordinates of the pointing device 110 to the receiving unit 120. A reference point of the pointing device 11 may be the center of a triangle formed by the antennas 111a, 111b, and 111c.

Thus calculated position coordinates (x, y) are inputted into a coordinate calculation unit 113b. In the case where the inputted position coordinates (set to (x1, y1)), which are inputted this time, are different from another pair of inputted position coordinates (set to (x0, y0)), which were inputted last time, the coordinate calculation unit 113b calculates an amount of movement (x1−x0, y1−y0) made by the pointing device 110 by using those two pairs of coordinates. That is, the coordinate calculation unit 113b functions as a means for calculating the amount of movement made by the pointing device 110. However, the amount of movement is not calculated if the coordinates are inputted for the first time.

The coordinate calculation unit 113b stores the inputted position coordinates (x, y) in a memory (cache) in the control unit 113. However, in the case where another pair of position coordinates (x0, y0) inputted last time have been stored, the control unit 113 updates the memory with the new position coordinates (x1, y1).

Thus calculated amount of movement (x1−x0, y1−y0) is transmitted to the receiving unit 120. The receiving unit 120 outputs the received amount of movement (x1−x0, y1−y0) to the PC from the interface unit 124.

Figure 6B:
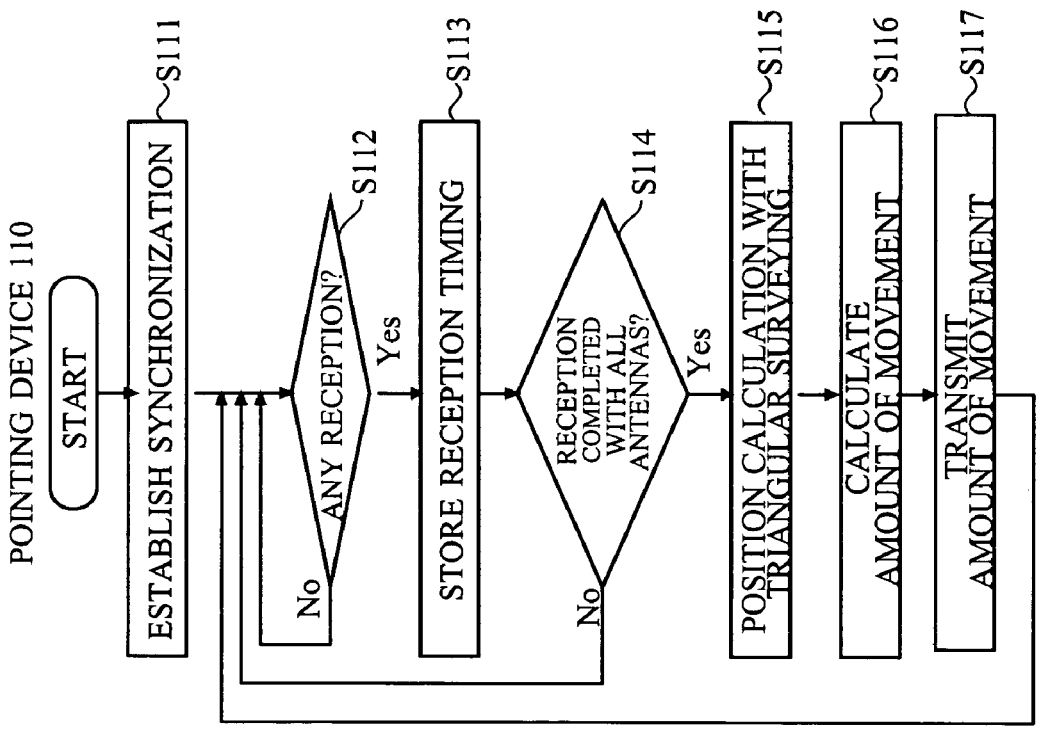
FIG. 6B is a flowchart describing operations of the pointing device 110.
Figure 6A:
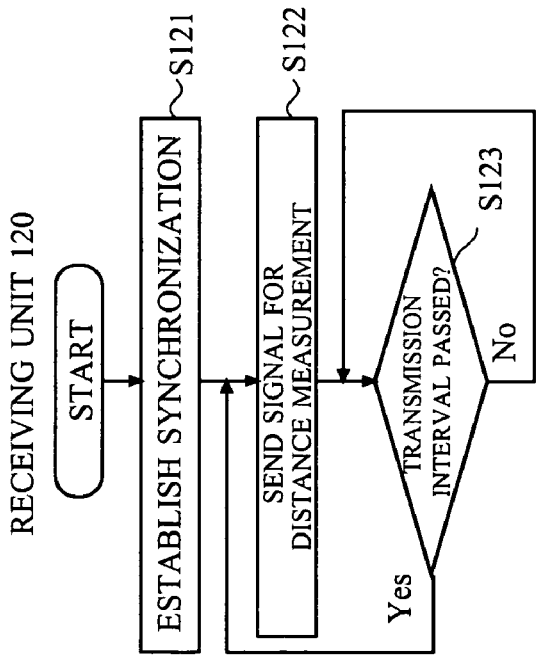
FIGS. 6A and 6C are flowcharts describing operations of the receiving unit 120.
Figure 6C:
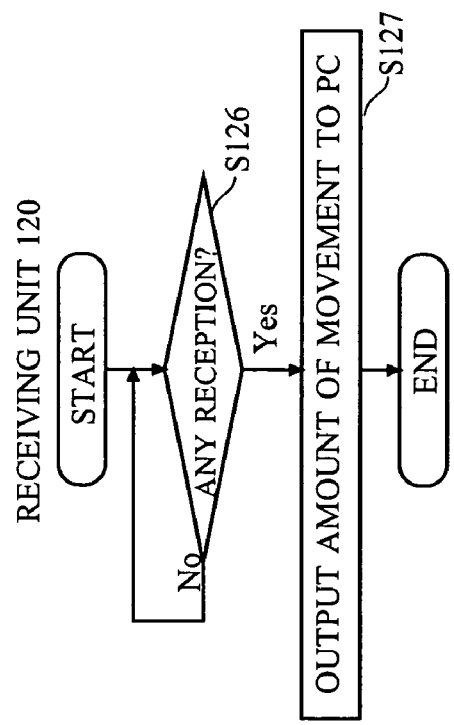

Next, a description will now be given of overall operations of the pointing device 110 and the receiving unit 120 with reference to FIGS. 6A through 6C. FIGS. 6A and 6C are flowcharts describing the operations of the receiving unit 120. FIG. 6B is a flowchart describing the operations of the pointing device 110.

The receiving unit 120, after activated, transmits a signal for filling a gap in synchronization from the antenna 121, and establishes the synchronization with the pointing device 110, with reference to FIG. 6A (step S121). Then the receiving unit 120 sends the signal for distance measurement from the antenna 121 (step S122). The receiving unit 120 judges whether or not a preset transmission interval has passed (step S123). If the interval has passed (Yes in step S123), the receiving unit 120 goes back to step S122 to transmit the signal for distance measurement.

In contrast, the pointing device 110 establishes the synchronization with the receiving unit 120 (step S111). The pointing device 110 judges whether or not the pointing device 110 has received the signal for distance measurement from the receiving unit 120 (step S112). If the pointing device 110 has received the signal (Yes in step S112), the reception timing is stored (step S113). In addition, the pointing device 110 also stores data for identifying a received antenna (one of the antennas 111a, 111b, and 111c) after associating the data with the reception timing.

Then, the pointing device 110 judges whether or not all the three antennas 111a, 111b, and 111c have received the same signal for distance measurement (step S114). If all the three antennas 111a, 111b, and 111c have received the signal (Yes in step S114), the position coordinates are calculated based on the reception timing and the transmission timing (step S115). The pointing device 110 calculates the amount of movement (x1−x0, y1−y0) based on the position coordinates of last time (x0, y0) and the position coordinates of this time (x1, y1) (step S116), and transmits the calculated amount of movement to the reception unit 120 (step S117). Then, the pointing device 110 goes back to step S112 and waits for another reception. If all the antennas have not received (No in step S114), the pointing device 110 goes back to step S112 and waits for another reception.

Referring to FIG. 6C, if the receiving unit 120 receives the amount of movement (x1−x0, y1−y0) from the pointing device 110 (Yes in step S126), the receiving unit 120 outputs the amount of movement into the PC.

Above-mentioned operations enable to operate a pointer displayed on a display screen of the PC.

In the case where the coordinate input device 100 is used on a desk, for example, there is a chance that the position of the pointing device 110 to the receiving unit 120 may be limited to a certain area. The certain area here is equivalent to one of the areas divided by a straight line on the desk. The line joins the two antennas (111a and 111b, for example) of the pointing device 110. This applies to the case where the receiving unit 120 is placed at the end of the desk.

Figure 7:
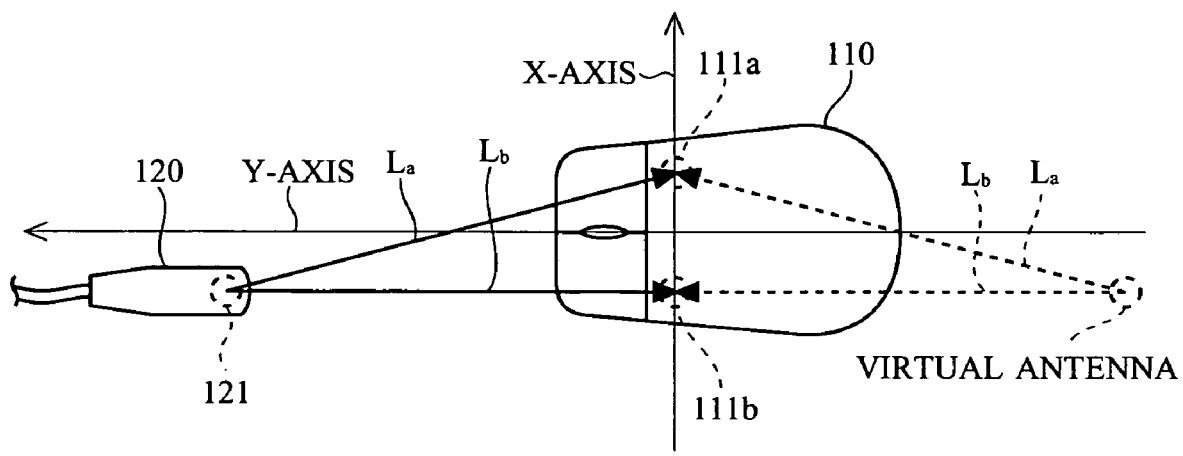
FIG. 7 illustrates position coordinates of an antenna 121 that is detected in the case where one of antennas of the pointing device 110 is reduced.

In the case mentioned above, the two antennas may be installed in the pointing device 110 with reference to FIG. 7. In other words, one of the three antennas in the first embodiment can be omitted (preferably 111c). La and Lb are calculated by the distances that the position detection unit 113a. In the case where the position coordinates of the antenna 121 from the distances La and Lb are calculated, based on the principle of the triangular surveying, the position coordinates of a virtual antenna can be calculated, in addition to the position coordinates of the existing antenna 121. So, the position detection unit 113a chooses the position coordinates included in a predetermined area as correct ones. For example, in the case where the line joining the antennas 111a and 111b is x-axis and a vertical line perpendicular to the x-axis is y-axis, the position detection unit 113a chooses the position coordinates having a positive y-axis as correct ones. Then, as described above, the coordinate data is generated based on the chosen coordinates, and is transmitted to the receiving unit 120. Thus, it is possible to operate the pointer displayed on the PC display screen.

A description will now be given of a second embodiment of the present invention. Hereinafter, in the second embodiment, the same components and configurations as those of the first embodiment have the same reference numerals and a detailed explanation will be omitted, if not otherwise specified.

Figure 8:
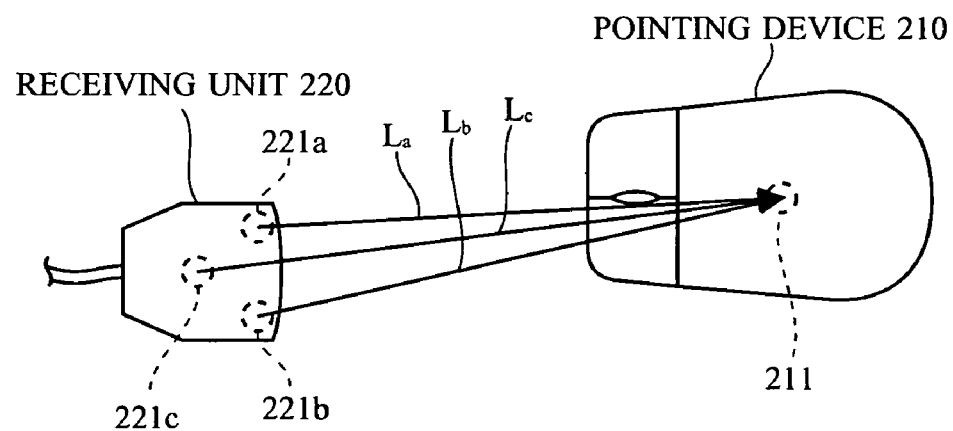
FIG. 8 is a top view illustrating a coordinate input device 200 in accordance with a second embodiment of the present invention.

FIG. 8 is a top view illustrating a coordinate input device 200 in accordance with the second embodiment of the present invention. Referring to FIG. 8, the coordinate input device 200 includes a pointing device 210 and a receiving unit 220. The pointing device 210 and the receiving unit 220 send and receive data with the UWB signal.

The pointing device 210 receives three UWB signals respectively transmitted from three antennas 221a, 221b, and 221c of the receiving unit 220. A reception timing of receiving with an antenna 211 the UWB signals transmitted from the three antennas 221a, 221b, and 221c depends on distances La, Lb, and Lc. As in the first embodiment, the distances La, Lb, and Lc are the distances between the antenna 211 and the three antennas 221a, 221b, and 221c. In the second embodiment, with this principle, calculated are the distance between the antenna 211 and the three antennas 221a, 221b, and 221c. That is, the propagation distances of the UWB signals are calculated so as to specify position coordinates (x, y) of the pointing device 210 to the receiving unit 220, with the principle of triangular surveying. A detailed description will now be given with reference to drawings. In the second embodiment, the center of a triangle formed by the three antennas 221a, 221b, and 221c is set to the origins (0, 0).

Figure 9:
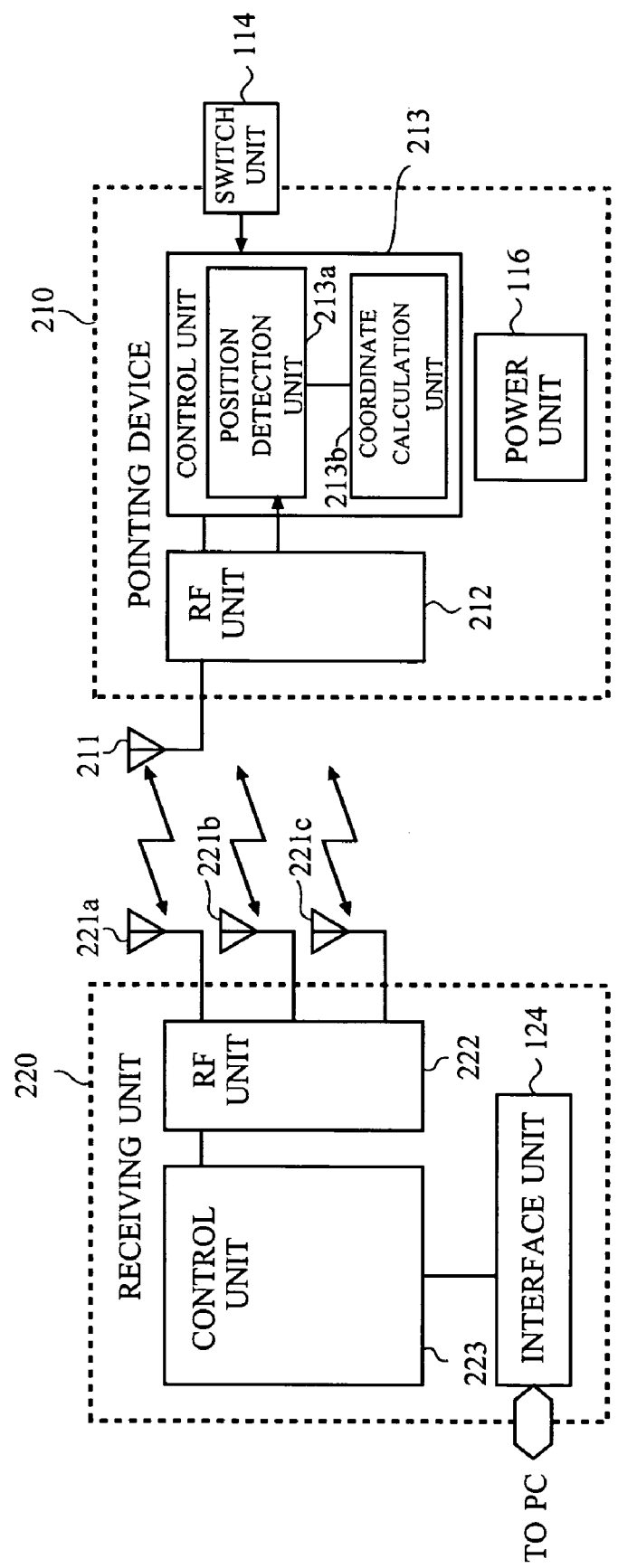
FIG. 9 is a block diagram showing system architecture of a pointing device 210 and a receiving unit 220 in the second embodiment.

FIG. 9 is a block diagram showing system architecture of a pointing device 210 and a receiving unit 220 in the second embodiment. In FIG. 9, the pointing device 210 is a mouse or a pen-type coordinate input device, for example, as in the first embodiment. The pointing device 210 includes an antenna 211, an RF unit 212, a control unit 213, a switch unit 114, and a power unit 116. The power unit 116 includes a dry battery or the like so as to provide each unit with electricity. The switch unit 114 is an input device such as a click button, a wheel button, or the like. Operation information inputted from the switch unit 114 is inputted into the control unit 213. The control unit 213 performs a given process on the operation information, and inputs the operation information into the RF unit 212 as a data signal. The RF unit 212 spread spectrum modulates the data signal with the use of a preset spread spectrum code, and transmits this base band signal without change from the antenna 211 as a UWB signal. Also, the RF unit 212 functions as a communication unit.

The receiving unit 220 includes an antennas 221a, 221b, and 221c, an RF unit 222, a control unit 223, and an interface unit 124. The UWB signal received by one of the antennas 221a, 221b, and 221c is inputted into an RF unit 222, and is converted into a data signal. The RF unit 222 spread spectrum demodulates the inputted UWB signal with a given spread spectrum code so as to obtain the original data signal. The data signal is inputted into the control unit 223, and a given process is carried out, then the data signal is outputted to a PC from the interface unit 124. Also, the RF unit 222 functions as a communication unit.

The receiving unit 220 transmits signals for distance measurement from the antennas 221a, 221b, and 221c regularly (for example once every 30 milliseconds) and simultaneously. The signals for distance measurement are UWB signals that have been spread spectrum modulated with the spread spectrum code. The pointing device 210 receives these three signals for distance measurement with three antennas 221a, 221b, and 221c. The received three signals for distance measurement are inputted into the RF unit 212, and are spread spectrum demodulated with the spread spectrum code generated at respective reception timings. By comparing the timing when the respective signals for distance measurement are transmitted from the antennas 221a, 221b, and 221c (transmission timing) with the reception timing, calculated are the propagation times of the three signals for distance measurement to reach the antenna 211. Also, the distances La, Lb, and Lc are calculated when the propagation time multiplies by a propagation speed of an electric wave. How to calculate the distances La, Lb, and Lc is the same as the first embodiment, a detailed description is omitted here. Also, the same as the first embodiment are how a position detection unit 213a calculates the position coordinates (x, y) with the calculated distances La, Lb, and Lc, based on the principle of the triangular surveying and how a coordinate calculation unit 213b calculates an amount of movement (x1−x0, y1−y0); therefore a detailed description is omitted here.

Figure 10B:
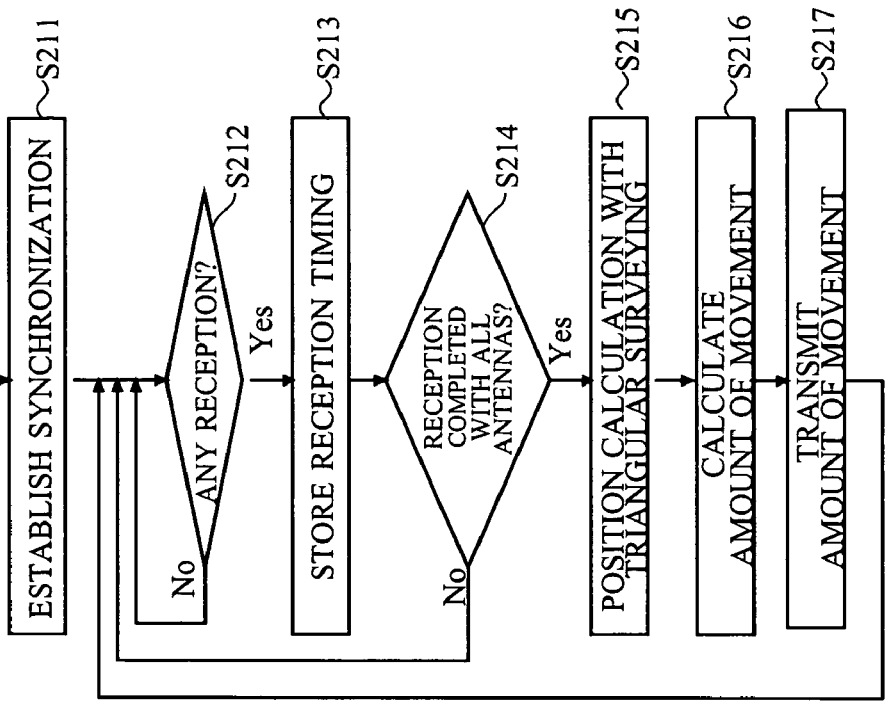
FIG. 10B is a flowchart describing operations of the pointing device 210.
Figure 10A:
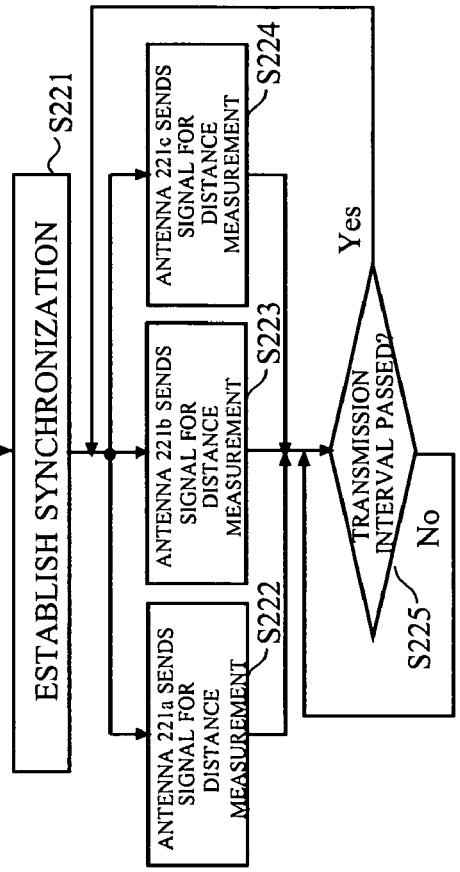
FIGS. 10A and 10C are flowcharts describing operations of the receiving unit 220.
Figure 10C:
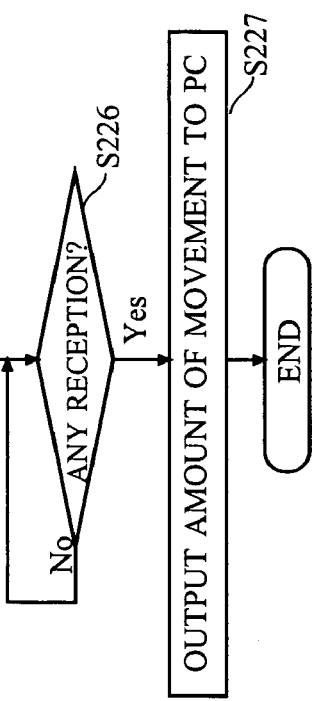

Next, a description will now be given of overall operations of the pointing device 210 and the receiving unit 220 with reference to FIGS. 10A through 10C FIGS. 10A and 10C are flowcharts describing the operations of the receiving unit 220. FIG. 10B is a flowchart describing the operations of the pointing device 210.

The receiving unit 220, after activated, transmits a signal for filling a gap in synchronization from the antenna 221, and establishes the synchronization with the pointing device 210 with reference to FIG. 10A (step S221). Then the receiving unit 220 sends the signals for distance measurement from the antennas 221a, 221b, and 221c respectively (step S222 through step S224). The receiving unit 220 judges whether or not the preset transmission interval has passed (step S225). If the interval has passed (Yes in step S225), the receiving unit 220 goes back to step S222 through step S224 to transmit the signals for distance measurement.

In contrast, the pointing device 210 establishes the synchronization with the receiving unit 220 (step S211 in FIG. 10B). The pointing device 210 judges whether or not pointing device 210 has received the signals for distance measurement from the receiving unit 220 (step S212). If pointing device 210 has received the signals (Yes in step S212), the reception timing is stored (step S213). In addition, the pointing device 210 also stores data for identifying a transmitting antenna (one of the antennas 221a, 221b, and 221c) after associating the data with the reception timing.

Then, the pointing device 210 judges whether or not the pointing device 210 has received the signals for distance measurement simultaneously transmitted from all the three antennas 221a, 221b, and 221c (step S114). If pointing device 210 has received all the three signals (Yes in step S214), the position coordinates are calculated based on the reception timing and the transmission timing (step S215). The pointing device 210 calculates the amount of movement (x1−x0, y1−y0) based on the position coordinates of last time (x0, y0) and the position coordinates of this time (x1, y1) (step S216), and transmits the calculated amount of movement to the reception unit 220 (step S217). Then, the pointing device 210 goes back to step S212 and waits for another reception. If pointing device 210 has not received all the signals (No in step S214), the pointing device 210 goes back to step S212 and waits for another reception.

Referring to FIG. 10C, if the receiving unit 220 receives the amount of movement (x1−x0, y1−y0) from the pointing device 210 (Yes in step S226), the receiving unit 220 outputs the amount of movement into the PC.

Above-mentioned operations enable to operate a pointer displayed on the display screen of the PC.

In the case where the coordinate input device 200 is used on a desk, for example, there is a chance that the position of the pointing device 210 to the receiving unit 220 may be limited to a certain area. The certain area here is equivalent to one of the areas divided by a straight line on the desk. The line joins the two antennas (221a and 221b, for example) of the pointing device 210. This applies to the case where the receiving unit 220 is placed at the end of the desk.

Figure 11:
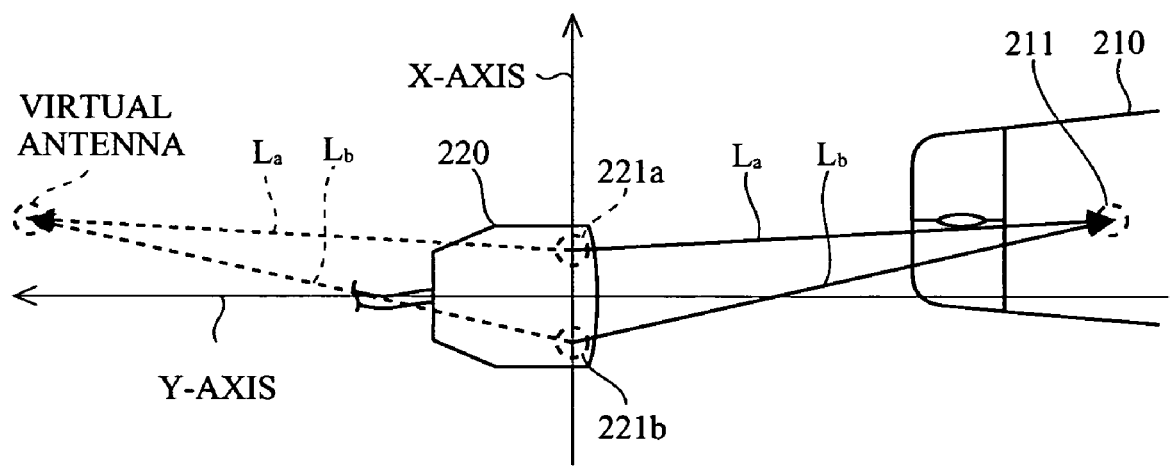
FIG. 11 illustrates position coordinates of an antenna 211 that is detected in the case where one of antennas of the receiving unit 220 is reduced.

In the case mentioned above, two antennas may be installed in the pointing device 220 with reference to FIG. 11. In other words, one of the three antennas in the second embodiment can be omitted (preferably 221c). La and Lb are the distances that the position detection unit 213a calculates. In the case where the position coordinates of the antenna 221 from the distances La and Lb are calculated based on the principle of the triangular surveying, the position coordinates of a virtual antenna is calculated, in addition to the position coordinates of the existing antenna 221. So, the position detection unit 213a chooses the position coordinates included in a predetermined area as correct ones. For example, in the case where the line joining the antennas 221a and 221b is x-axis, and a vertical line perpendicular to the x-axis is y-axis, the position detection unit 213a chooses the position coordinates having a positive y-axis as correct ones. Then, as described above, the coordinate data is generated based on the chosen coordinates, and is transmitted to the receiving unit 220. Thus, it is possible to operate the pointer displayed on the PC display screen.

A description will now be given of a third embodiment of the present invention. Hereinafter, in the third embodiment, the same components and configurations as those of the first embodiment have the same reference numerals and a detailed explanation will be omitted, if not otherwise specified.

Figure 12:
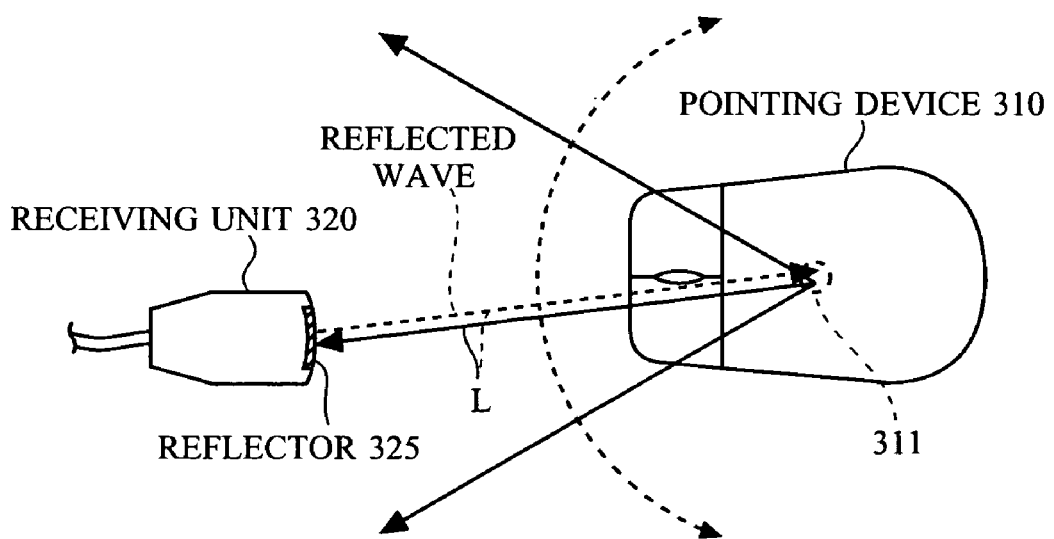
FIG. 12 is a top view illustrating a coordinate input device 300 in accordance with a third embodiment of the present invention.

In the third embodiment, the radar capability is leveraged. FIG. 12 is a top view illustrating a coordinate input device 300 in accordance with the third embodiment of the present invention. Referring to FIG. 12, the coordinate input device 300 includes a pointing device 310 and a receiving unit 320. The pointing device 310 and the receiving unit 320 send and receive data with the use of the UWB signal.

Figure 13A:
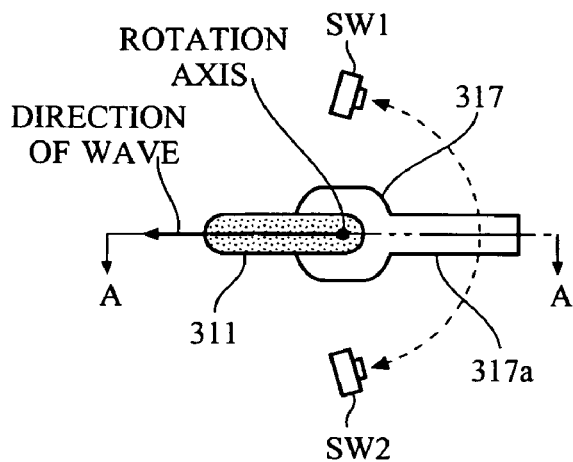
FIG. 13A is a top view illustrating an antenna 311.
Figure 13B:
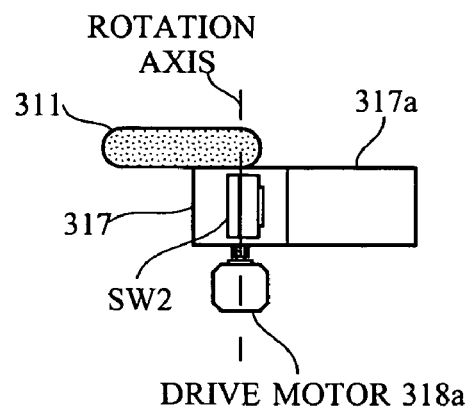
FIG. 13B is a cross-sectional view of the line of A-A of FIG. 13A.
Figure 13C:
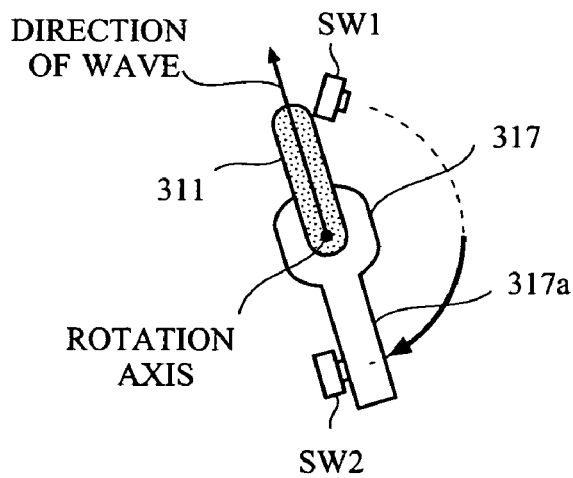
FIG. 13C is a top view of the antenna 311 turned clockwise.
Figure 13D:
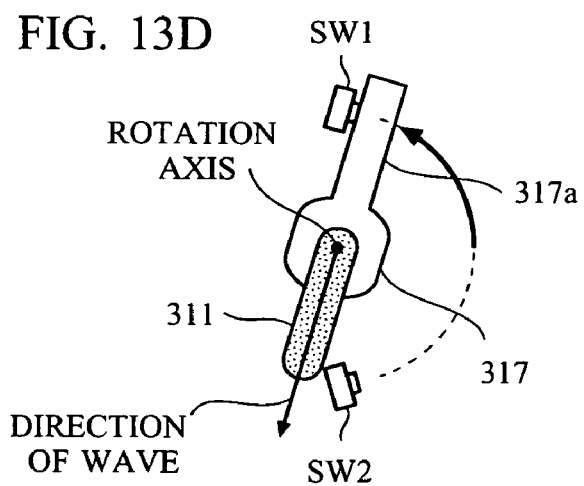
FIG. 13D is a top view of the antenna 311 turned counter-clockwise.

An antenna 311 of the pointing device 310 is a directional antenna, and is designed to be capable of rotating the antenna in the direction of transmitting an electric wave. FIGS. 13A through 13D illustrate the antenna 311. FIG. 13A is a top view of the antenna 311. FIG. 13B is a cross-sectional view of the line of A-A of FIG. 13A. FIG. 13C is a top view of the antenna 311 turned clockwise. FIG. 13D is a top view of the antenna 311 turned counterclockwise.

Referring to FIGS. 13A and 13B, the antenna 311 is attached to a plate for pushing a switch 317. The plate for pushing the switch 317 is capable of swinging when driven by a drive motor 318a. An arm unit 317a is attached to the plate for pushing the switch 317. In the case where the plate for pushing the switch 317 is turned clockwise, with reference to FIG. 13C, the arm unit 317a pushes a switch SW2 installed in a given place on a plane of rotation. In the case where the switch SW2 is pushed, the drive motor 318a is controlled to turn the plate for pushing the switch 317 counterclockwise. Then, when the plate for pushing the switch 317 is turned counterclockwise, with reference to FIG. 13D, the arm unit 317a pushes a switch SW1 installed in a given place on a plane of rotation. In the case where the switch SW1 is pushed, the drive motor 318a is controlled to turn the plate for pushing the switch 317 clockwise. Above-mentioned operations are repeated, and the antenna 311 swings in a cycle.

Figure 14:
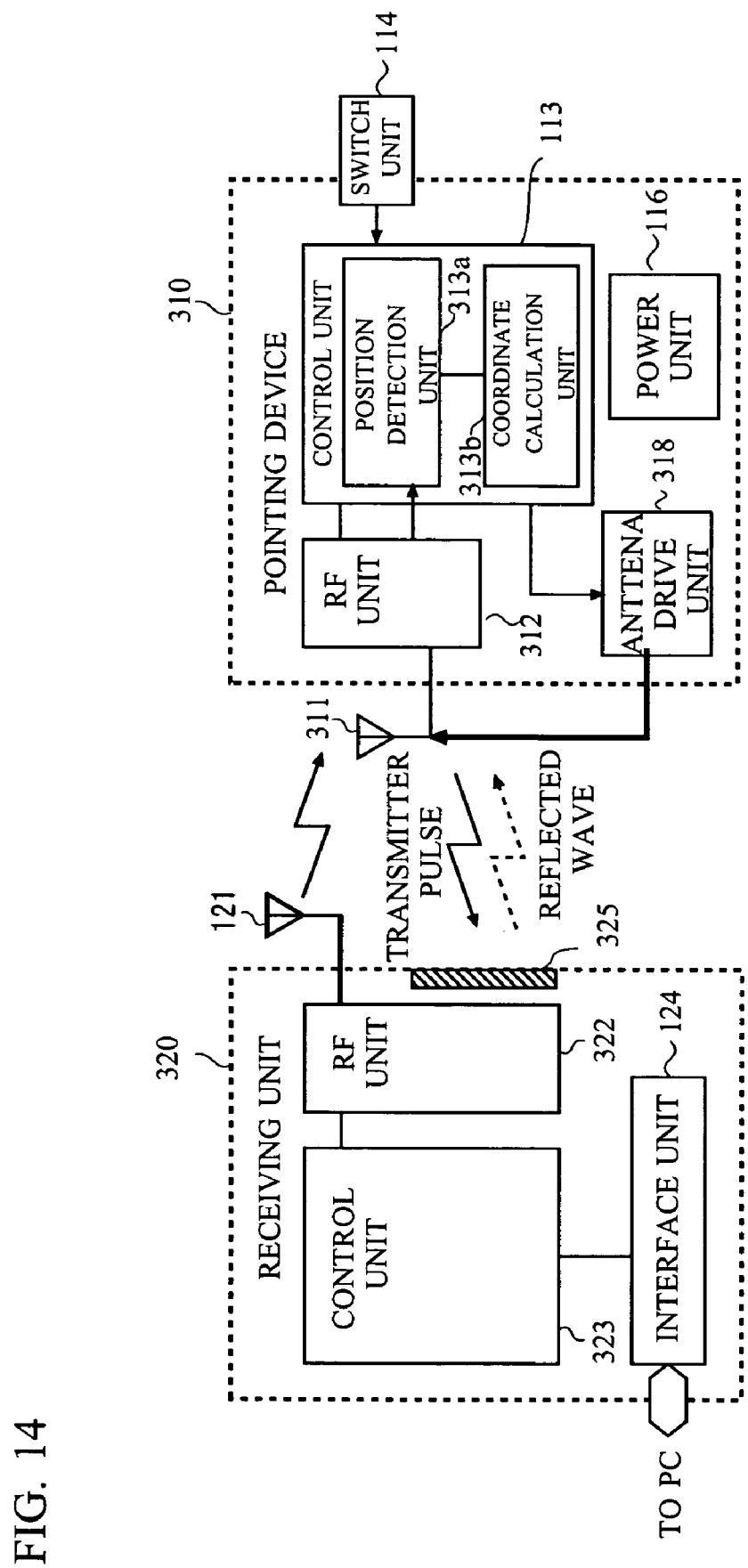
FIG. 14 is a block diagram showing system architecture of a pointing device 310 and a receiving unit 320 in a third embodiment.

FIG. 14 is a block diagram showing system architecture of the pointing device 310 and the receiving unit 320 in the third embodiment. In FIG. 14, the pointing device 310 is a mouse or a pen-type coordinate input device, for example, as in the first embodiment. The pointing device 310 includes an antenna 311, an RF unit 312, a control unit 313, a switch unit 114, a power unit 116, and an antenna drive unit 318. The power unit 116 includes a dry battery or the like so as to provide each unit with electricity. The switch unit 114 is an input device such as a click button, a wheel button, or the like. Operation information inputted from the switch unit 114 is inputted into the control unit 313. The control unit 313 performs a given process on the operation information, and inputs the operation information into the RF unit 312 as a data signal. The RF unit 312 spread spectrum modulates the data signal with the use of a preset spread spectrum code, and transmits this base band signal without change from the antenna 311 as the UWB signal.

The receiving unit 320 includes an antenna 121, an RF unit 322, a control unit 323, an interface unit 124, and a reflector 325. The reflector 325 is installed on the housing surface of the receiving unit 320. The UWB signal received by the antenna is inputted into an RF unit 322, and is converted into a data signal. The RF unit 322 spread spectrum demodulates the inputted UWB signal with the use of a given spread spectrum code so as to obtain the original data signal. The original data signal is inputted into the control unit 223, a given process is carried out, and the data signal is outputted to a PC from the interface unit 124.

The antenna drive unit 318 of the pointing device 310 includes the drive motor 318a and two switches SW1 and SW2. The drive motor 318a is controlled by the control unit 313 to swing the antenna 311. That is, the antenna drive unit 318 functions as a means for driving the antenna 311. In the case where the switches SW1 and SW2 are pushed by the arm unit 317a, a given voltage signal is inputted into the control unit 313. The control unit 313 measures time with an internal clock, from the timing when one of the switches SW1 and SW2 is pushed, to the timing when the other of the switches SW1 and SW2 is pushed. The antenna 311 swings according to a given cycle, and thus measured time corresponds to a swinging angle (hereinafter referred to as antenna angle). Based on the above-mentioned correspondence, the control unit 313 is capable of specifying the antenna angle of the antenna 311.

The swinging antenna 311 transmits a pulse of the UWB signals regularly. The transmitted pulse of the UWB signals is generated in the control unit 313. That is, the control unit 313 functions as a means for transmitting the UWB signal. Here, in the case where the electric wave is directed toward the reflector 325 of the receiving unit 320, the pulse transmitted from the antenna 311 (which is referred to as a transmitter pulse) is reflected on the reflector 325. The reflected pulse (which is referred to as a reflected wave) is received by the antenna 311. The FR unit 312 of the pointing device 310 measures time with an internal clock, from the timing when the transmitter pulse is transmitted (transmission timing), to the timing when the reflected wave is received (reception timing). That is, the RF unit 312 functions as a means for measuring time from the timing when the UWB signal is transmitted to the timing when the reflected wave is received. Thus, the propagation time is measured. Also, the RF unit 312 functions as a communication unit.

Thus measured times in the RF unit 312 are inputted into the position detection unit 313a of the control unit 313. By converting the inputted measured times into duration in the position detection unit 313a, calculated is the propagation time of the UWB signal. Here, the calculated propagation time is two times (go and return) the real distance L (2 L), and the position detection unit 313a calculates the propagation distance of the UWB signal by multiplying the inputted propagation time by a half the propagation speed of the electric wave. That is, the position detection unit 313a functions as a means for calculating the propagation distance of the UWB signal. Also, the antenna angle specified by the control unit 313 is also inputted into the position detection unit 313a. The position detection unit 313a calculates the position coordinates (x, y) of the antenna 121, based on the calculated propagation distance (which corresponds to L). That is, the position detection unit 313a functions as a means for calculating the position coordinates of the pointing device 310 to the receiving unit 320. In the third embodiment, the position coordinates of the antenna 121 correspond to those of the receiving unit 320.

Thus calculated position coordinates (x, y) are inputted into a coordinate calculation unit 313b. The operations of the coordinate calculation unit 313b are the same as the first embodiment, and a detailed description is omitted here.

Figure 15A:
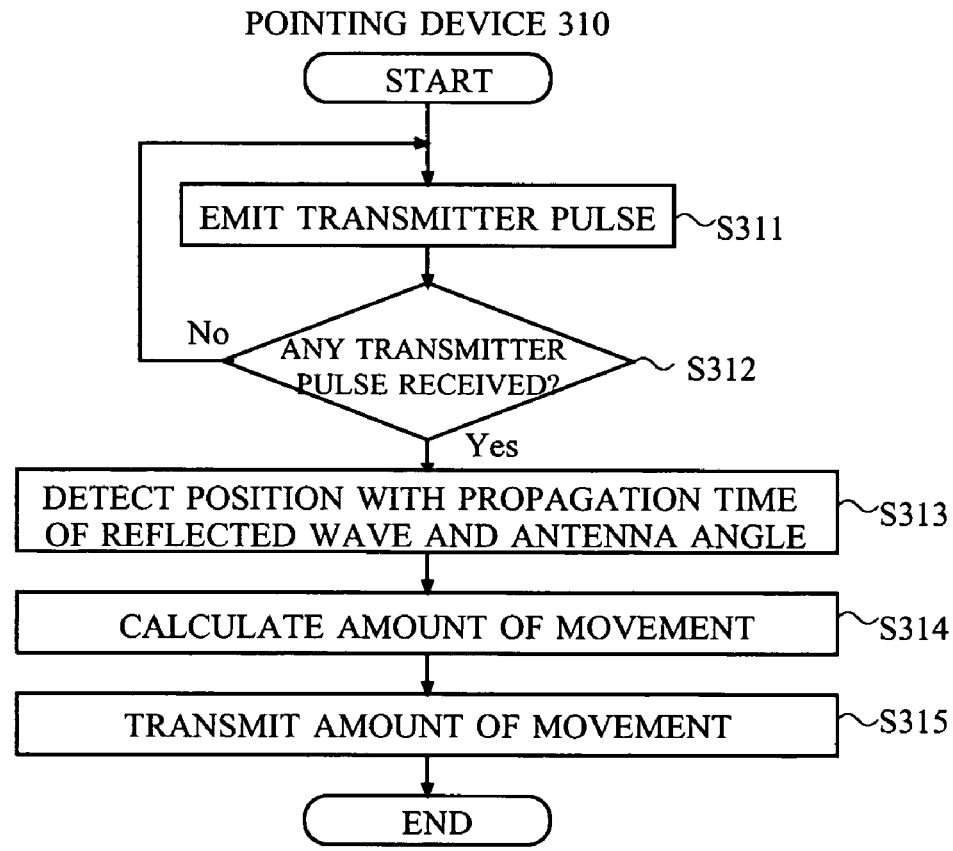
FIG. 15A is a flowchart describing operations of the receiving unit 320.
Figure 15B:
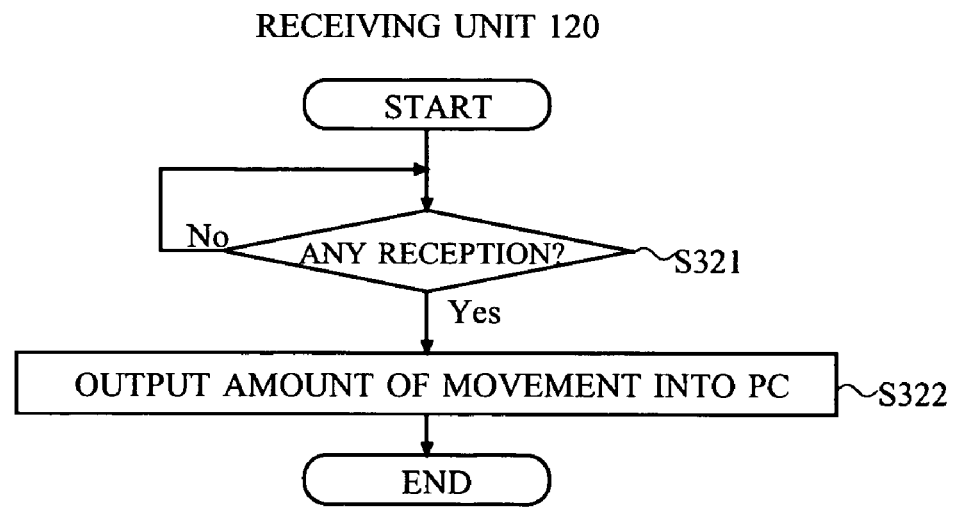
FIG. 15B is a flowchart describing operations of the pointing device 310.

Next, a description will now be given of overall operations of the pointing device 310 and the receiving unit 320 with reference to FIGS. 15A and 15B. FIG. 15A is a flowchart describing the operations of the pointing device 310. FIG. 15B is a flowchart describing the operations of the receiving unit 320.

The pointing device 310, with reference to FIG. 15A, transmits the transmitter pulse (the UWB signal) first (step S311), and judges whether or not the pointing device 310 has received the reflected wave of the transmitter pulse (step S312). If the pointing device 310 has received the reflected wave (Yes in step S312), the pointing device 310 calculates the propagation distance and the antenna angle, and detects the position coordinates of the receiving unit 320 based on the propagation distance and the antenna angle (step S313). Then, the pointing device 310 calculates the amount of movement (x1−x0, y1−y0), based on the position coordinates of the last time (x0, y0) and the position coordinates of this time (x1, y1) (step S314), and transmits the amount of movement to the receiving unit 320 (step S315). If the pointing device 310 has received the reflected wave (No in step S312), the pointing device 310 goes back to step S311 to transmit the transmitter pulse at the next timing.

Referring to FIG. 15B, if the receiving unit 320 receives the amount of movement (x1−x0, y1−y0) from the pointing device 310 (Yes in step S321), the receiving unit 320 outputs the amount of movement into the PC (step S322).

Above-mentioned operations enable to operate the pointer displayed on the PC display screen.

A description will now be given of a fourth embodiment of the present invention. Hereinafter, in the fourth embodiment, the same components and configurations as those of the first embodiment have the same reference numerals and a detailed explanation will be omitted, if not otherwise specified.

Figure 16:
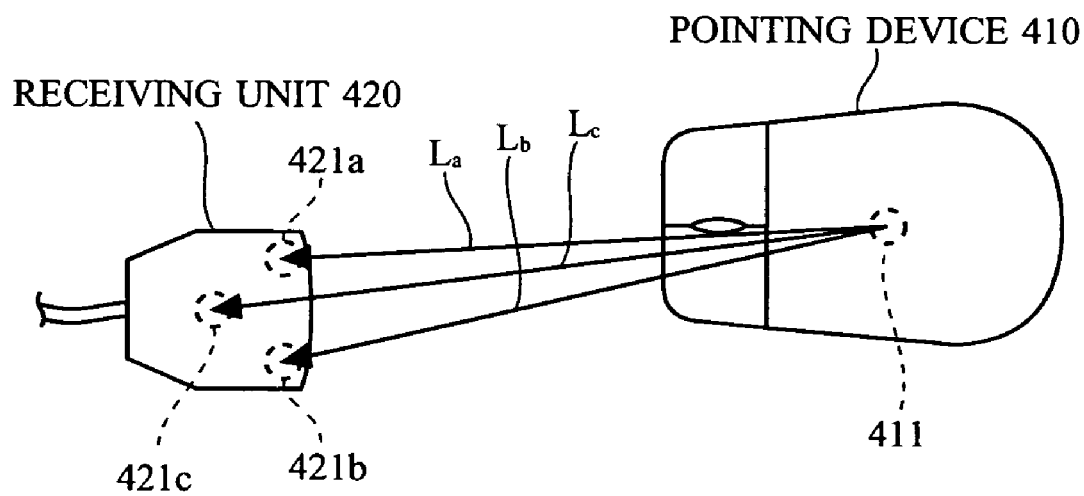
FIG. 16 is a top view illustrating a coordinate input device 400 in accordance with a fourth embodiment of the present invention.

FIG. 16 is a top view illustrating a coordinate input device 400 in accordance with the forth embodiment of the present invention. Referring to FIG. 16, the coordinate input device 400 includes a pointing device 410 and a receiving unit 420. The pointing device 410 and the receiving unit 420 send and receive data with the UWB signal.

The receiving unit 420 receives the UWB signals with three antennas 421a, 421b, and 421c. The UWB signals are transmitted from an antenna 411 of the pointing device 410. Reception timings received with 421a, 421b, and 421c depend on La, Lb, and Lc. La, Lb, and Lc correspond to the distances between the antenna 411 and the three antennas 421a, 421b, and 421c of the receiving unit 420, as in the first embodiment. In the fourth embodiment, with this principle, calculated are the distance between the antenna 411 and the three antennas 421a, 421b, and 421c. That is, the propagation distances of the UWB signals are calculated so as to specify position coordinates (x, y) of the pointing device 410 to the receiving unit 420, with the principle of triangular surveying. A detailed description will now be given with reference to drawings. In the fourth embodiment, the center of a triangle formed by the three antennas 421a, 421b, and 421c is set to the origins (0, 0).

Figure 17:
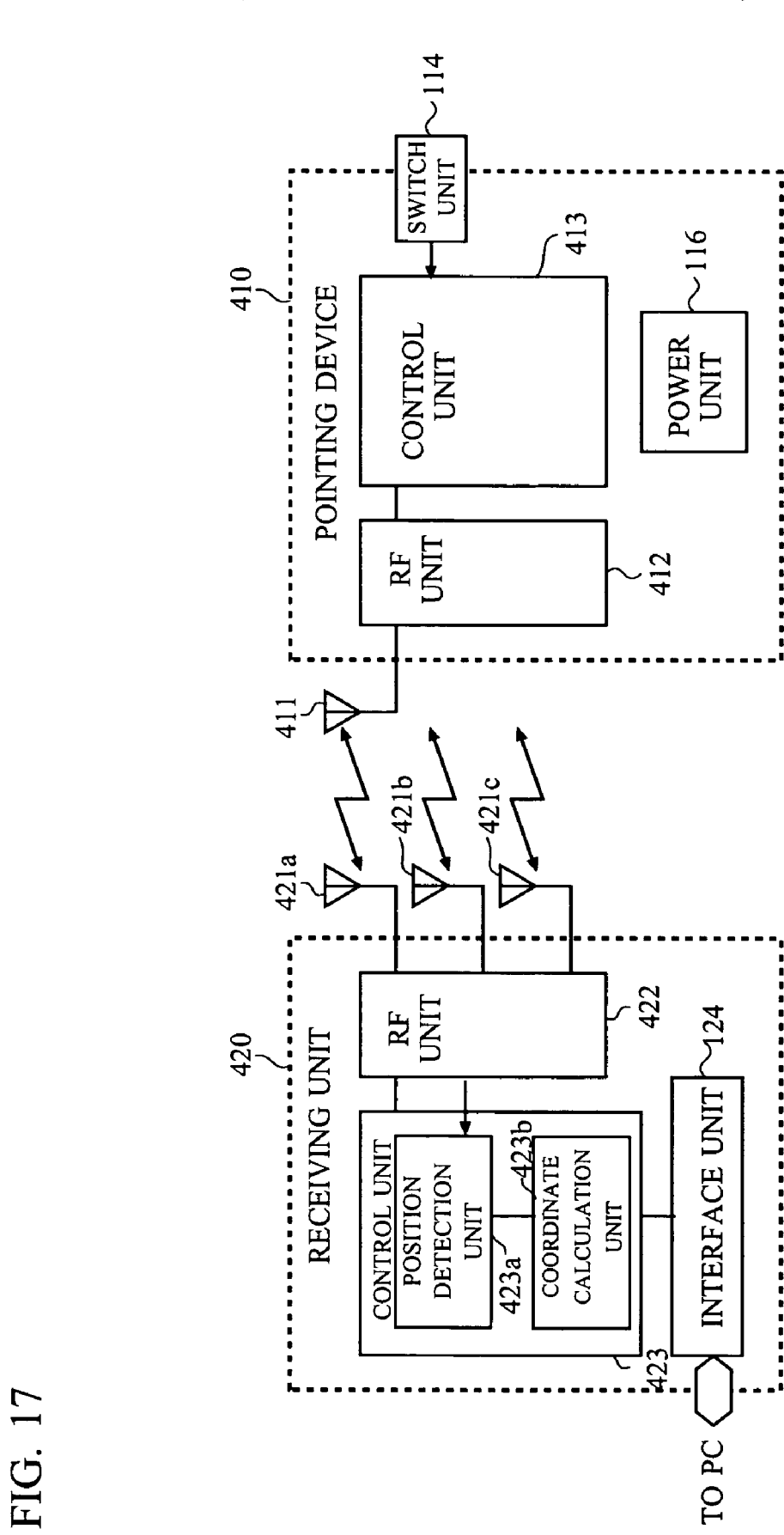
FIG. 17 is a block diagram showing a pointing device 410 and a receiving unit 420 in the fourth embodiment.

FIG. 17 is a block diagram showing system architecture of a pointing device 410 and a receiving unit 420 in the fourth embodiment. In FIG. 17, the pointing device 410 is a mouse or a pen-type coordinate input device, for example, as in the first embodiment. The pointing device 410 includes the antenna 411, an RF unit 412, a control unit 413, a switch unit 114, and a power unit 116. The power unit 116 includes a dry battery or the like so as to provide each unit with electricity. The switch unit 114 is an input device such as a click button, a wheel button, or the like. Operation information inputted from the switch unit 114 is inputted into the control unit 413. The control unit 413 performs a given process on the operation information, and inputs the operation information into the RF unit 412 as a data signal. The RF unit 412 spread spectrum modulates the data signal with a preset spread spectrum code, and transmits this base band signal without change from the antenna 411 as a UWB signal. Also, the RF unit 412 functions as a communication unit.

The receiving unit 420 has the three antennas 421a, 421b, and 421c, an RF unit 422, a control unit 423, and an interface unit 124. A UWB signal received with one of the three antennas 421a, 421b, and 421c is inputted into the RF unit 422. The FR unit 422 spread spectrum demodulates the inputted UWB signal with a given spread spectrum code to obtain the original data signal. The original data signal is inputted into the control unit 423. In the control unit 423, a given process is carried out. Then, the data signal is outputted to a PC from the interface unit 124.

The pointing device 410 transmits signals for distance measurement from an antenna 411 regularly (for example, once every 30 milliseconds). The signals for distance measurement are the UWB signals that have been spread spectrum modulated with the spread spectrum code. The receiving 420 receives the signals for distance measurement with the three antennas 421a, 421b, and 421c. The received signals for distance measurement are inputted into the RF unit 412, and are spread spectrum demodulated with the spread spectrum code generated at respective reception timings. By comparing the timings when the respective signals for distance measurement are transmitted from the antenna 411 (transmission timing) with the reception timing, calculated is the propagation times of the three signals for distance measurement to reach the antennas 421a, 421b, and 421c. Also, the distances La, Lb, and Lc are calculated when the propagation time multiplied by the propagation speed of an electric wave. How to measure the distances La, Lb, and Lc is the same as the first embodiment, a detailed description is omitted here. Also, same as the first embodiment are how a position detection unit 423a calculates the position coordinates (x, y) with the calculated distances La, Lb, and Lc, based on the principle of the triangular surveying and how a coordinate calculation unit 413b calculates an amount of movement (x1−x0, y1−y0). Therefore, a detailed description is omitted here.

Figure 18B:
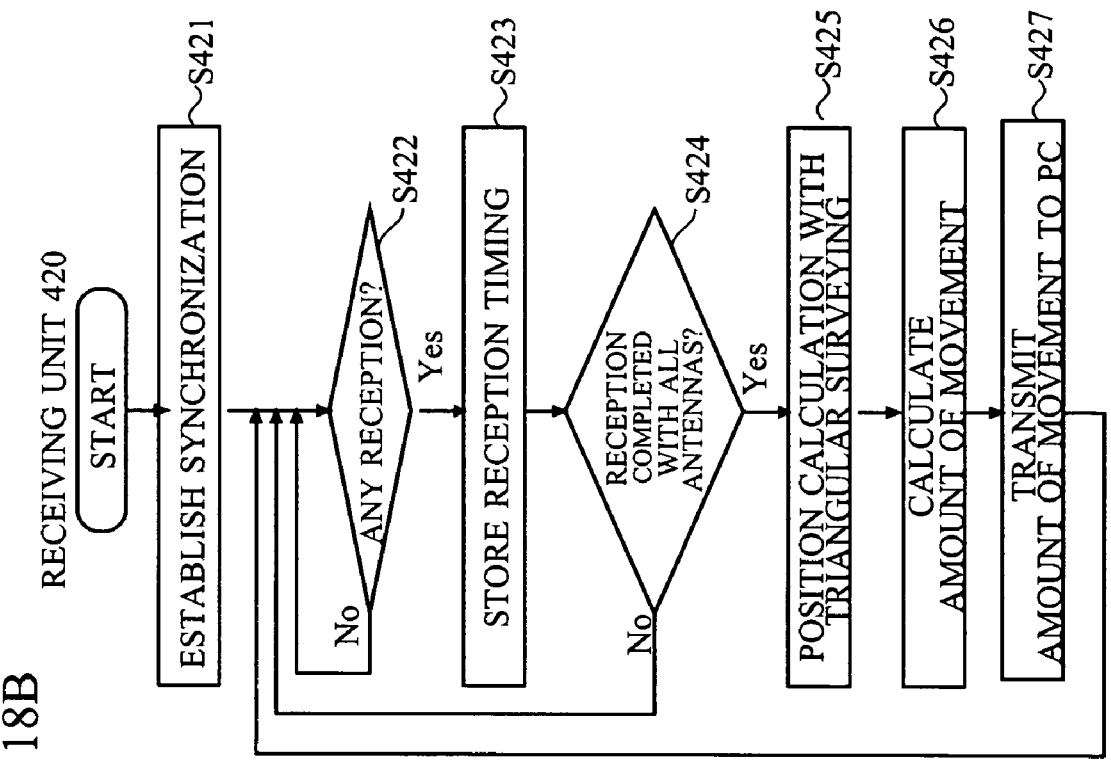
FIG. 18B is a flowchart describing operations of the receiving unit 420.
Figure 18A:
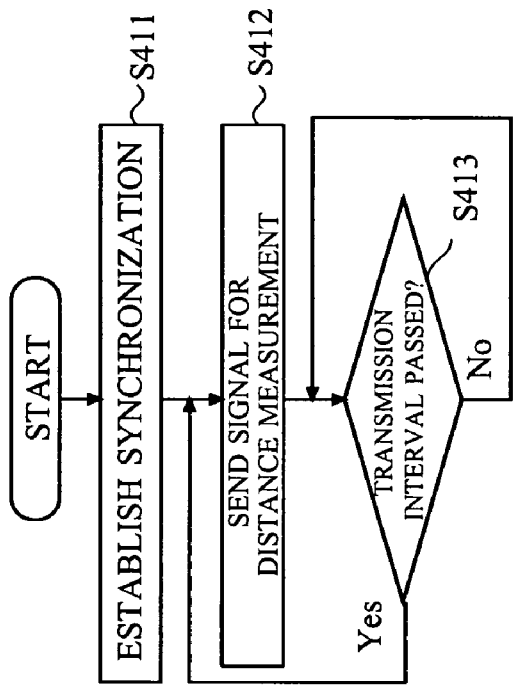
FIG. 18A is a flowchart describing operations of the pointing device 410.

Next, a description will now be given of overall operations of the pointing device 410 and the receiving unit 420 with reference to FIGS. 18A and 18B. FIG. 18A is a flowchart describing the operations of the pointing device 410. FIG. 18B is a flowchart describing the operations of the receiving unit 420.

The pointing device 410, after activated, receives a signal for filling a gap in synchronization from the receiving unit 420, and establishes the synchronization with the receiving unit 420 with reference to FIG. 18A (step S411). Then the pointing device 410 sends the signal for distance measurement from the antenna 411 (step S412). The pointing device 410 judges whether or not the preset transmission interval has passed (step S413). If the interval has passed (Yes in step S413), the pointing device 410 goes back to step S412 to transmit the signal for distance measurement.

In contrast, the receiving unit 420, after activated, transmits a signal for filling a gap in synchronization from the antenna 421, and establishes the synchronization with the pointing device 410 with reference to FIG. 18B (step S421). Then, the receiving unit 420 judges whether or not the receiving unit 420 has received the signal for distance measurement from the pointing device 410 (step S422). If the receiving unit 420 has received the signal (Yes in step S422), the reception timing is stored (step S423). In addition, the receiving unit 420 also stores data for identifying a received antenna (one of the antennas 421a, 421b, and 421c) after associating the data with the reception timing.

Then, the pointing device 410 judges whether or not all the three antennas 421a, 421b, and 421c have received the same signals for the distance measurement (step S424). If all the three antennas 421a, 421b, and 421c have received the same signals (Yes in step S424), the position coordinates are calculated based on the reception timing and the transmission timing (step S425). The receiving unit 420 calculates the amount of movement (x1−x0, y1−y0) based on the position coordinates of last time (x0, y0) and the position coordinates of this time (x1, y1) (step S426), and transmits the calculated amount of movement to the PC (step S427). If all the three antennas 421a, 421b, and 421c have not received the same signals (No in step S424), the pointing device 410 goes back to step S422 and waits for another reception.

Above-mentioned operations enable to operate a pointer displayed on the display screen of the PC.

In the case where the coordinate input device 400 is used on a desk, for example, there is a chance that the position of the receiving unit 420 to the pointing device 410 may be limited to a certain area. The certain area here is equivalent to one of the areas divided by a straight line on the desk. The line joins the two antennas (421a and 421b, for example) of the receiving unit 420. This applies to the case where the receiving unit 420 is placed at the end of the desk.

Figure 19:
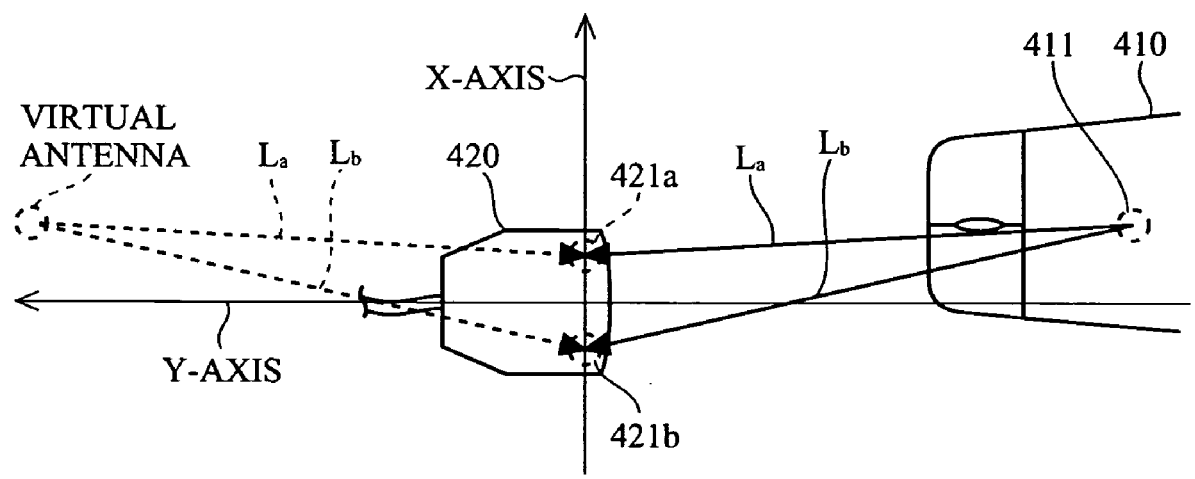
FIG. 19 illustrates position coordinates of an antenna 411 that is detected in the case where one of antennas of the receiving unit 420 is reduced.

In the case mentioned above, two antennas may be installed in the receiving unit 420 with reference to FIG. 19. In other words, one of the three antennas in the fourth embodiment can be omitted (preferably 421c). La and Lb are the distances that the position detection unit 423a calculates. In the case where the position coordinates of the antenna 411 from the distances La and Lb are calculated based on the principle of the triangular surveying, the position coordinates of a virtual antenna can be calculated, in addition to the position coordinates of the existing antenna 411. So, the position detection unit 423a chooses the position coordinates included in a predetermined area as correct ones. For example, in the case where the line joining the antennas 421a and 421b is x-axis and a vertical line perpendicular to the x-axis is y-axis, the position detection unit 423a chooses the position coordinates having a negative y-axis as correct ones. Then, as described above, the coordinates data are generated based on the chosen coordinates, and are outputted into the PC. Thus, it is possible to operate the pointer displayed on the PC display screen.

A description will now be given of a fifth embodiment of the present invention. Hereinafter, in the fifth embodiment, the same components and configurations as those of the first embodiment have the same reference numerals and a detailed explanation will be omitted, if not otherwise specified.

Figure 20:
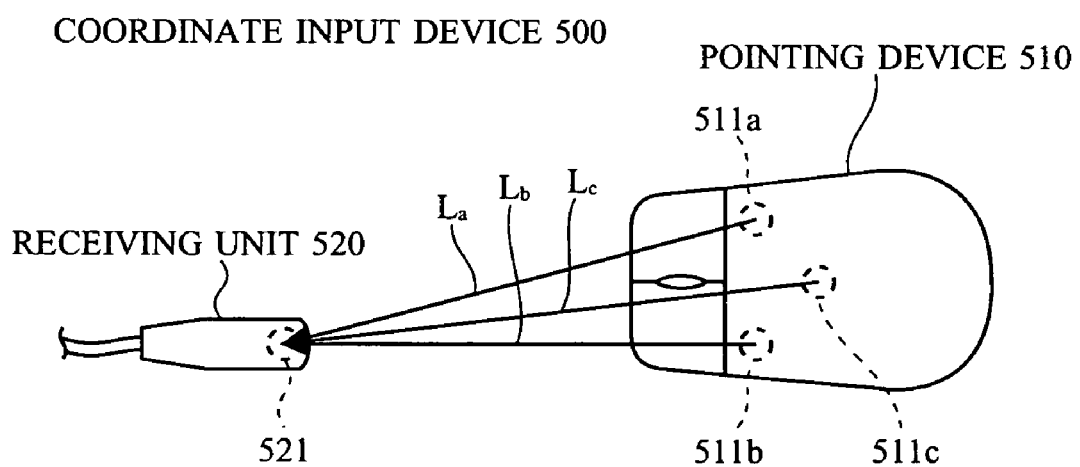
FIG. 20 is a top view illustrating a coordinate input device 500 in accordance with a fifth embodiment of the present invention.

FIG. 20 is a top view illustrating a coordinate input device 500 in accordance with the fifth embodiment of the present invention. Referring to FIG. 20, the coordinate input device 500 includes a pointing device 510 and a receiving unit 520. The pointing device 510 and the receiving unit 520 send and receive data with the UWB signal.

The receiving unit 520 receives the three UWB signals respectively transmitted from three antennas 511a, 511b, and 511c. The UWB signals are received with an antenna 521 of the pointing device 510. The timing when the antenna 521 receives the UWB signals transmitted from the antennas 511a, 511b, and 511c depends on distances La, Lb, and Lc from the antenna 521 to the antennas 511a, 511b, and 511c. In the fifth embodiment of the present invention, by utilizing the above-mentioned principle, respectively calculated are the distances La, Lb, and Lc between the antenna 521 and the antennas 511a, 511b, and 511c. The distances La, Lb, and Lc are the propagation distances of the UWB signals. Then, the principle of triangular surveying is applied to the distances so as to specify position coordinates (x, y) of the pointing device 510 to the receiving unit 520. Now, referring to the drawings, a description will be given of the entire system and architecture of the fifth embodiment. In this description of the fifth embodiment, the receiving unit 520 (particularly, the antenna 521) is set to the origins (0, 0).

Figure 21:
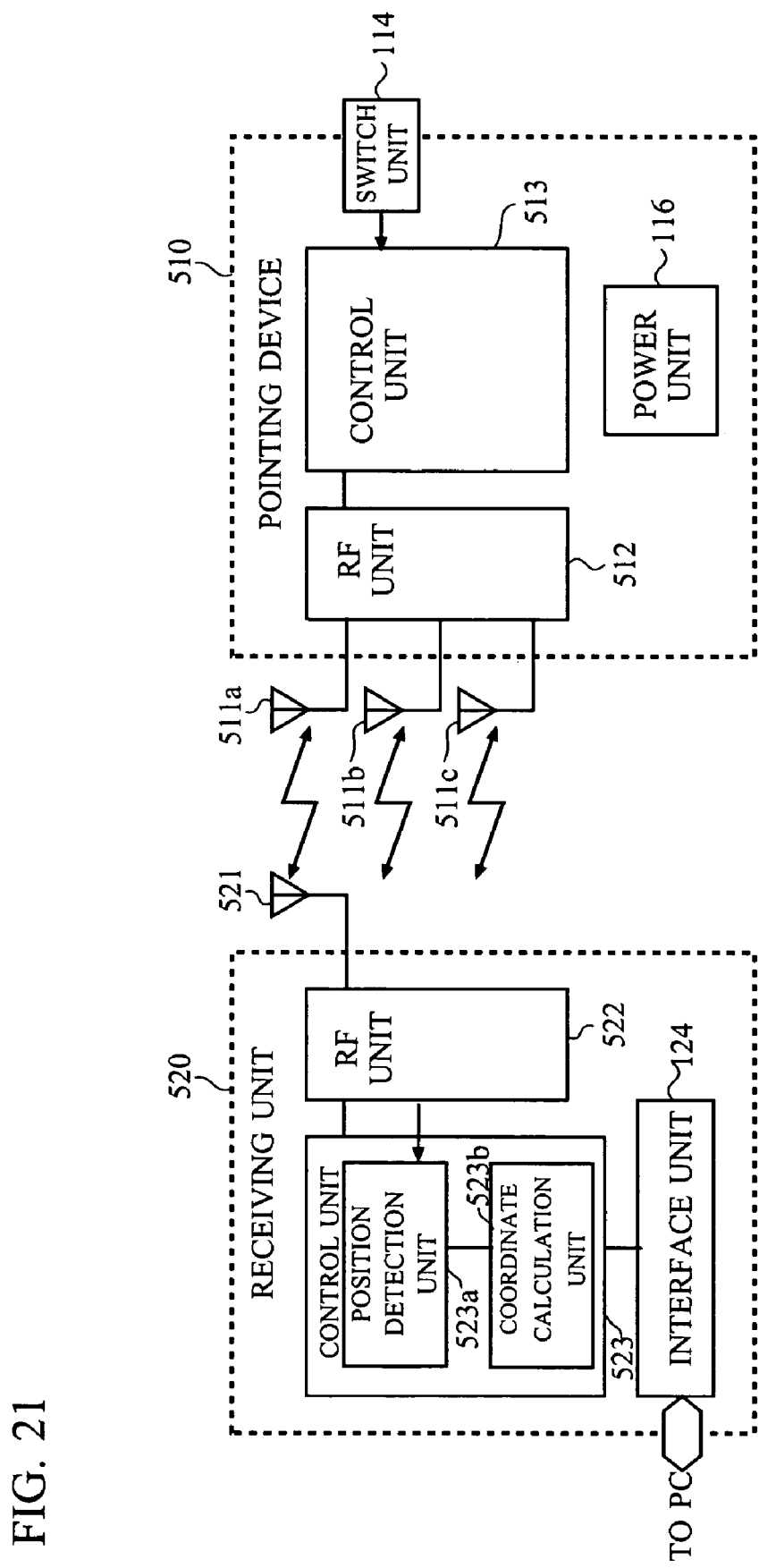
FIG. 21 is a block diagram showing system architecture of a pointing device 510 and a receiving unit 520 in the fifth embodiment.

FIG. 21 is a block diagram showing system architecture of a pointing device 510 and a receiving unit 520 in the fifth embodiment. In FIG. 21, the pointing device 510 is a mouse or a pen-type coordinate input device, for example, as in the first embodiment. The pointing device 510 includes the three antennas 511a, 511b, and 511c, an RF unit 512, a control unit 513, a switch unit 114, and a power unit 116. The power unit 116 includes a dry battery or the like so as to provide each unit with electricity. The switch unit 114 is an input device such as a click button, a wheel button, or the like. Operation information inputted from the switch unit 114 is inputted into the control unit 513. The control unit 513 performs a given process on the operation information, and inputs the operation information into the RF unit 512 as a data signal. The RF 512 spread spectrum modulates the data signal with a preset spread spectrum code, and transmits this base band signal without change from one of the antennas 511a, 511b, and 511c as a UWB signal.

The receiving unit 520 includes an antenna 521, an RF unit 522, a control unit 523, and an interface unit 124. The UWB signal received by the antenna 521 is inputted into the RF unit 522. The RF unit 522 spread spectrum demodulates the inputted UWB signal with a given spread spectrum code so as to obtain the original data signal. The original data signal is inputted into the control unit 523, a given process is carried out, and the signal is outputted to a PC from the interface unit 524.

The pointing device 510 transmits signals for distance measurement from antennas 511a, 511b, and 511c simultaneously and regularly (for example, once every 30 milliseconds). The receiving unit 520 receives the three signals for distance measurement with the antenna 521. The received three signals for distance measurement are inputted into the RF unit 522, and are spread spectrum demodulated with the spread spectrum code generated at respective reception timings. By comparing the timings when the respective signals for distance measurement are transmitted from the antennas 511a, 511b, and 511c (transmission timing) with the reception timing, calculated is the propagation time of the three signals for distance measurement to reach the antenna 521. Also, the distances La, Lb, and Lc are calculated by multiplying the propagation time by a propagation speed of an electric wave. How to measure the distances La, Lb, and Lc is the same as the first embodiment, a detailed description is omitted here. Also, the same as the first embodiment are how a position detection unit 523a calculates the position coordinates (x, y) with the calculated distances La, Lb, and Lc, based on the principle of the triangular surveying and how a coordinate calculation unit 513b calculates an amount of movement (x1−x0, y1−y0). Therefore a detailed description is omitted here.

Figure 22B:
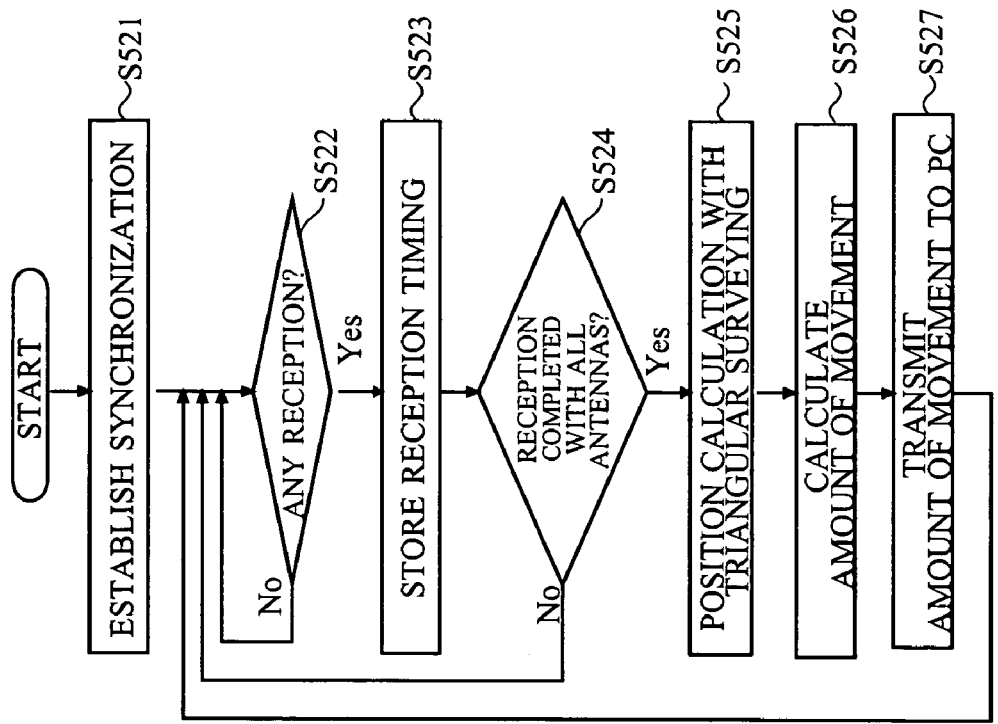
FIG. 22B is a flowchart describing operations of the receiving unit 520.
Figure 22A:
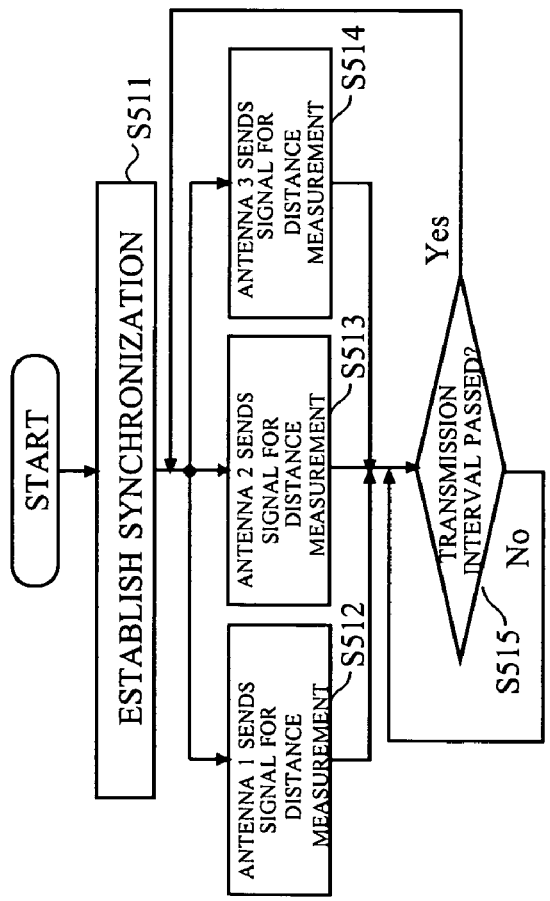
FIG. 22A is a flowchart describing operations of the pointing device 510.

Next, a description will now be given of overall operations of the pointing device 510 and the receiving unit 520 with reference to FIGS. 22A and 22B. FIG. 22A is a flowchart describing the operations of the pointing device 510. FIG. 22B is a flowchart describing the operations of the receiving unit 520.

The pointing device 510, after activated, receives a signal for filling a gap in synchronization from the receiving unit 520, and establishes the synchronization with the receiving unit 520 with reference to FIG. 22A (step S511). Then the pointing device 510 sends signals for distance measurement from the antennas 511a, 511b, and 511c (steps S512 through S514). The pointing device 510 judges whether or not the preset transmission interval has passed (step S515). If the interval has passed (Yes in step S515), the pointing device 510 goes back to steps S512 through S514 to transmit the signals for distance measurement.

In contrast, the receiving unit 520, after activated, first transmits a signal for filling a gap in synchronization from the antenna 521, and establishes the synchronization with the pointing device 510 with reference to FIG. 22B (step S521). Then, the receiving unit 520 judges whether or not the receiving unit 520 has received the signal for distance measurement from the pointing device 510 (step S522). If the receiving unit 520 has received the signal (Yes in step S522), the receiving unit 520 stores the reception timing (step S523). In addition, the receiving unit 520 also stores data for identifying a received antenna (one of the antennas 511a, 511b, and 511c) after associating the data with the reception timing.

Then, the receiving unit 520 judges whether or not the receiving unit 520 has received all the three signals for the distance measurement simultaneously transmitted from the antennas 511a, 511b, and 511c (step S524). If the receiving unit 520 has received all the three signals for the distance measurement (Yes in step S524), the position coordinates are calculated based on the reception timing and the transmission timing (step S525). The receiving unit 520 calculates the amount of movement (x1−x0, y1−y0) based on the position coordinates of last time (x0, y0) and the position coordinates of this time (x1, y1) (step S526), and transmits the calculated amount of movement to the PC (step S527). If the receiving unit 520 has received all the three signals for the distance measurement (No in step S524), the receiving unit 520 goes back to step S522 and waits for another reception.

Above-mentioned operations enable to operate a pointer displayed on the display screen of the PC.

In the case where the coordinate input device 500 is used on a desk for example, there is a chance that the position of the pointing device 510 to the receiving unit 520 may be limited to a certain area. The certain area here represents for one of the areas divided by a straight line on the desk. The line joins the two antennas (511a and 511b, for example) of the receiving unit 520. This applies to the case where the receiving unit 520 is placed at the end of the desk.

Figure 23:
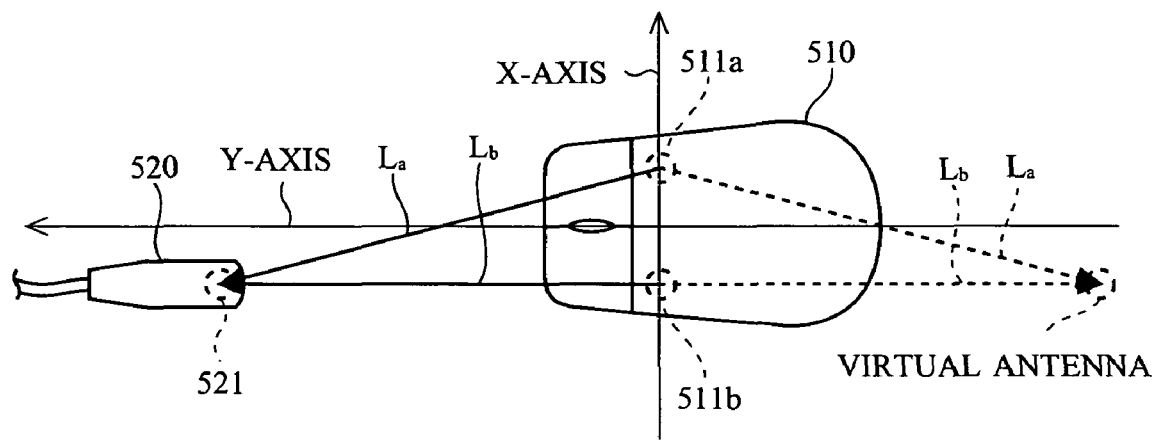
FIG. 23 illustrates position coordinates of an antenna 521 that is detected in the case where one of antennas of the pointing device 510 is reduced.

In the case mentioned above, two antennas may be installed in the receiving unit 520, with reference to FIG. 23. In other words, one of the three antennas in the fifth embodiment can be omitted (preferably 521c). La and Lb are the distances that the position detection unit 523a calculates. In the case where the position coordinates of the antenna 521 from the distances La and Lb are calculated based on the principle of the triangular surveying, the position coordinates of a virtual antenna is calculated, in addition to the position coordinates of the existing antenna 521. So, the coordinate calculation unit 523b chooses the position coordinates included in a predetermined area as correct ones. For example, in the case where the line joining the antennas 511a and 511b is x-axis and a vertical line perpendicular to the x-axis is y-axis, the position detection unit 523a chooses the position coordinates having a positive y-axis as correct ones. Then, as described above, the coordinate data is generated based on the chosen coordinates and is outputted into the PC. Thus, it is possible to operate the pointer displayed on the PC display screen.

A description will now be given of a sixth embodiment of the present invention, with reference to the drawings. Hereinafter, in the sixth embodiment, the same components and configurations as those of the first embodiment have the same reference numerals and a detailed explanation will be omitted, if not otherwise specified.

Figure 24:
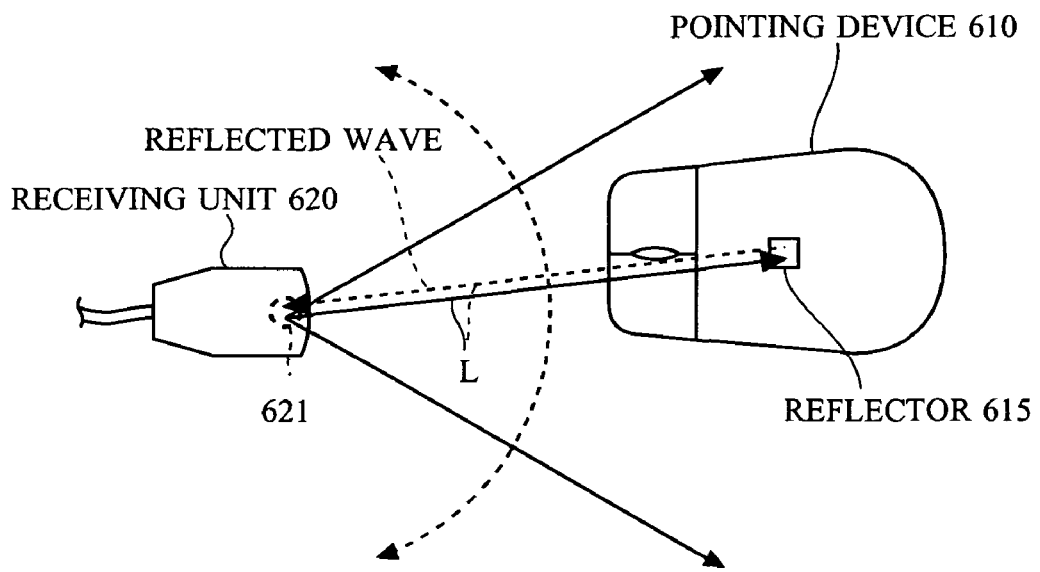
FIG. 24 is a top view illustrating a coordinate input device 600 in accordance with a sixth embodiment of the present invention.

In the sixth embodiment, the radar capability is leveraged. FIG. 24 is a top view illustrating a coordinate input device 600 in accordance with the sixth embodiment of the present invention. Referring to FIG. 24, the coordinate input device 600 includes a pointing device 610 and a receiving unit 620.

The pointing device 610 and the receiving unit 620 send and receive data with the UWB signal.

Figure 25A:
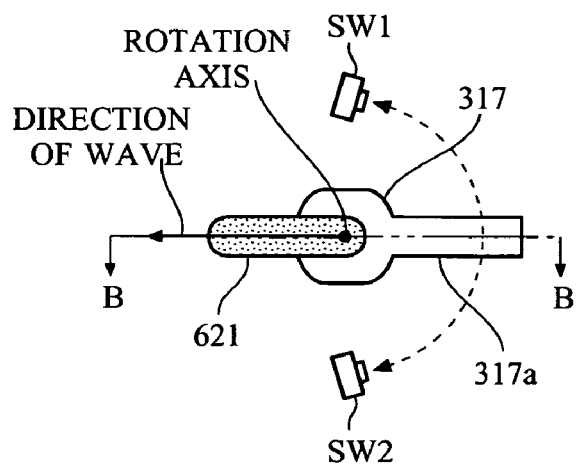
FIG. 25A is a top view illustrating an antenna 621.
Figure 25B:
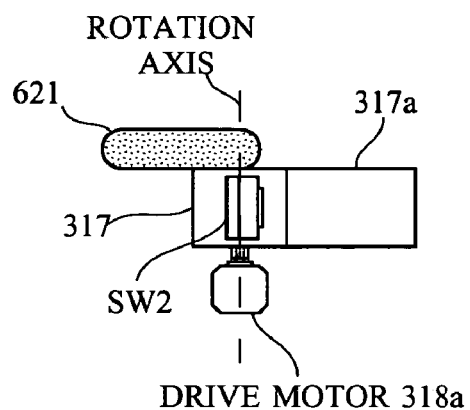
FIG. 25B is a cross-sectional view of the line of B-B of FIG. 25A.
Figure 25C:
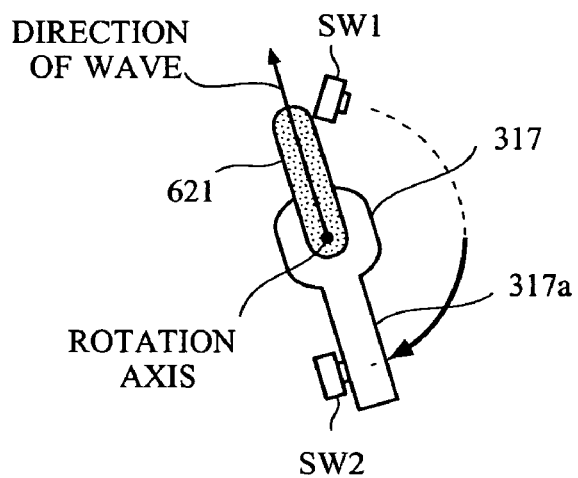
FIG. 25C is a top view of the antenna 621 turned clockwise.
Figure 25D:
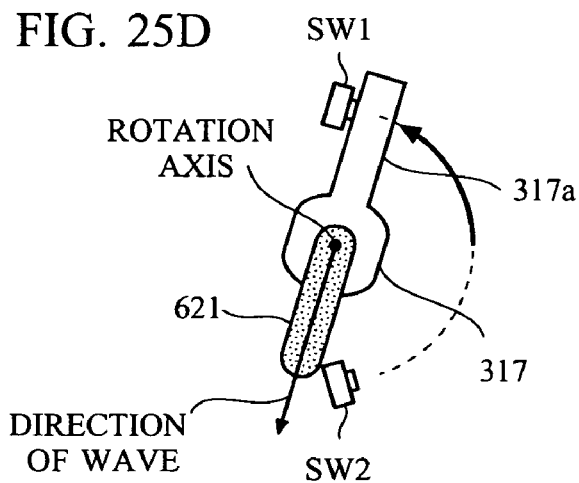
FIG. 25D is a top view of the antenna 621 turned counter-clockwise.

An antenna 621 of the receiving unit 620 is a directional antenna, and is designed to be capable of rotating the antenna in the direction of transmitting an electric wave. FIGS. 25A through 25D illustrate the antenna 621. FIG. 25A is a top view of the antenna 621. FIG. 25B is a cross-sectional view of the line of B-B of FIG. 25A. FIG. 25C is a top view of the antenna 621 turned clockwise. FIG. 25D is a top view of the antenna 621 turned counterclockwise.

Referring to FIGS. 25A and 25B, the antenna 621 is attached to a plate for pushing a switch 317. The plate for pushing the switch 317 is capable of swinging when driven by a drive motor 318a. An arm unit 317a is attached to the plate for pushing the switch 317. In the case where the plate for pushing the switch 317 is turned clockwise, with reference to FIG. 25C, the arm unit 317a pushes a switch SW2 installed in a given place on a plane of rotation. In the case where the switch SW2 is pushed, the drive motor 318a is controlled to turn the plate for pushing the switch 317 counterclockwise. Then, when the plate for pushing the switch 317 is turned counterclockwise, with reference to FIG. 25D, the arm unit 317a pushes a switch SW1 installed in a given place on a plane of rotation. In the case where the switch SW1 is pushed, the drive motor 318a is controlled to turn the plate for pushing the switch 317 clockwise. Above-mentioned operations are repeated, and the antenna 621 swings in a cycle.

Figure 26:
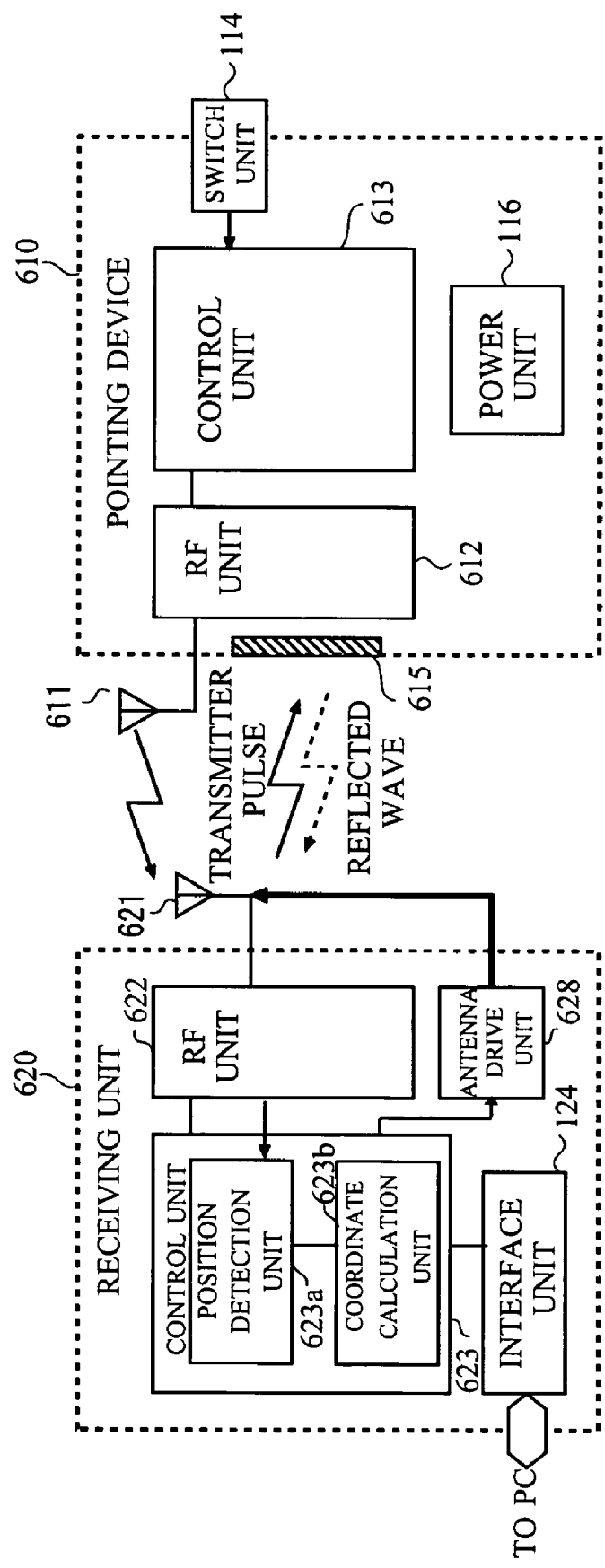
FIG. 26 is a block diagram showing system architecture of a pointing device 610 and a receiving unit 620 in the sixth embodiment.

FIG. 26 is a block diagram showing system architecture of the pointing device 610 and the receiving unit 620 in the sixth embodiment. In FIG. 26, the pointing device 610 is a mouse or a pen-type coordinate input device, for example, as in the first embodiment. The pointing device 610 includes an antenna 611, an RF unit 612, a control unit 613, a switch unit 114, a power unit 116, and a reflector 615. The reflector 615 is installed on a housing surface of the pointing device 610. The power unit 116 includes a dry battery or the like so as to provide each unit with electricity. The switch unit 114 is an input device such as a click button, a wheel button, or the like. Operation information inputted from the switch unit 114 is inputted into the control unit 613. The control unit 613 performs a given process on the operation information, and inputs the operation information into the RF unit 612 as a data signal. The RF unit 612 spread spectrum modulates the data signal with a preset spread spectrum code, and transmits this base band signal without change from the antenna 611 as the UWB signal.

The receiving unit 620 includes an antenna 621, an RF unit 622, a control unit 623, an interface unit 124, and an antenna drive unit 628. The UWB signal received by the antenna 621 is inputted into the RF unit 622. The RF unit 622 spread spectrum demodulates the inputted UWB signal with a given spread spectrum code so as to obtain the original data signal. The original data signal is inputted into the control unit 623, and a given process is carried out, and the data signal is outputted to a PC from the interface unit 124.

The antenna drive unit 628 of the receiving unit 620 includes the drive motor 318a and the two switches SW1 and SW2. The drive motor 318a is controlled by the control unit 623 to swing the antenna 621. In the case where the switches SW1 and SW2 are pushed by an arm unit 317a, a given voltage signal is inputted into the control unit 623. The control unit 623 measures time with an internal clock, from the timing when one of the switches SW1 and SW2 is pushed, to the timing when the other of the switches SW1 and SW2 is pushed. The antenna 621 swings according to a given cycle, and the thus measured time corresponds to the current antenna angle. Based on the above-mentioned correspondence, the control unit 623 is capable of specifying an antenna angle of the antenna 621.

The swinging antenna 621 transmits a pulse of the UWB signal regularly. The transmitted pulse of the UWB signal is generated in the control unit 623. Here, in the case where the electric wave is directed toward the reflector 615 of the pointing device 610, the pulse transmitted from the antenna 621 (which is referred to as a transmitter pulse) is reflected on the reflector 615. The reflected pulse (which is referred to as a reflected wave) is received by the antenna 621. The FR unit 622 of the receiving unit 620 measures time with an internal clock, from the timing when the transmitter pulse is transmitted (transmission timing), to the timing when the reflected wave is received (reception timing). Thus, the propagation time is calculated.

Thus measured time obtained in the RF unit 622 is inputted into a position detection unit 623a of the control unit 623. By converting the inputted measured time into duration, the propagation time of the UWB signal is calculated. Here, the calculated propagation time is two times (go and return) the real distance L (2 L), and the position detection unit 623a calculates the propagation distance of the UWB signal by multiplying the inputted propagation time by a half the propagation speed of the electric wave. Also, the antenna angle specified by the control unit 623 is also inputted into the position detection unit 623a. The position detection unit 623a calculates the position coordinates (x, y) of the antenna 611, based on the calculated propagation distance (which corresponds to L). In the sixth embodiment, the position coordinates of the antenna 611 correspond to those of the pointing device 610.

Thus calculated position coordinates (x, y) are inputted into a coordinate calculation unit 623b. The operations of the coordinate calculation unit 623b are same as the first embodiment, and a detailed description is omitted here.

Figure 27:
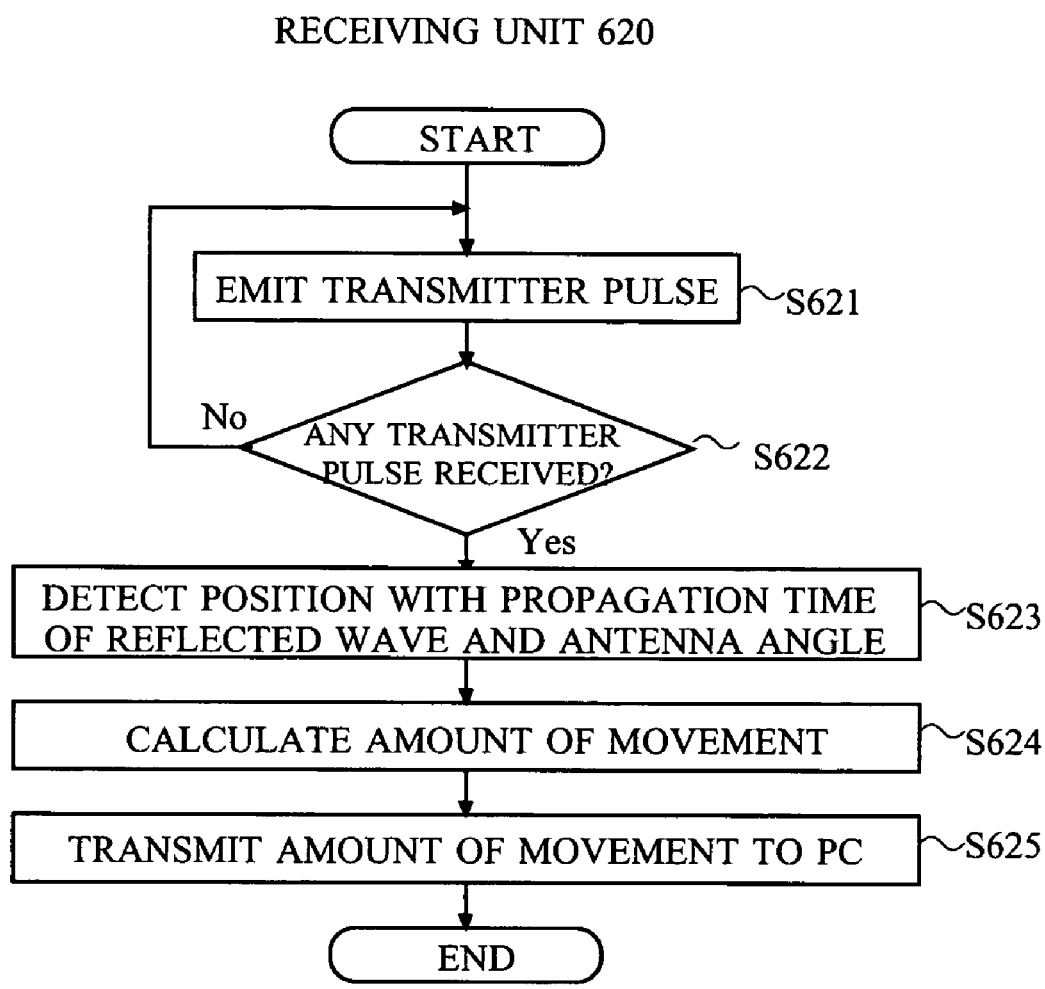
FIG. 27 is a flowchart describing operations of the receiving unit 620.

Next, a description will now be given of overall operations of the pointing device 610 and the receiving unit 620 with reference to FIG. 27. FIG. 27 is a flowchart describing operations of the receiving unit 620.

The receiving unit 620, with reference to FIG. 27, transmits the transmitter pulse (the UWB signal) first (step S621), and judges whether or not the receiving unit 620 has received the reflected wave of the transmitter pulse (step S622). If the receiving unit 620 has received the reflected wave (Yes in step S622), the receiving unit 620 calculates the propagation distance and the antenna angle, and detects the position coordinates of the pointing device 610 based on the propagation distance and the antenna angle (step S623). Then, the receiving unit 620 calculates the amount of movement (x1−x0, y1−y0) based on the position coordinate of the last time (x0, y0) and the position coordinate of this time (x1, y1) (step S624), and transmits the amount of movement to a PC (step S625). If the receiving unit 620 has not received the reflected wave (No in step S622), the receiving unit 620 goes back to step S621, and transmits the transmitter pulse at the next timing.

Above-mentioned operations enable to operate the pointer displayed on the PC display screen.

A description will now be given of a seventh embodiment, with reference to drawings. Hereinafter, in the seventh embodiment, the same components and configurations as those of the first embodiment have the same reference numerals and a detailed explanation will be omitted, if not otherwise specified.

Figure 28:
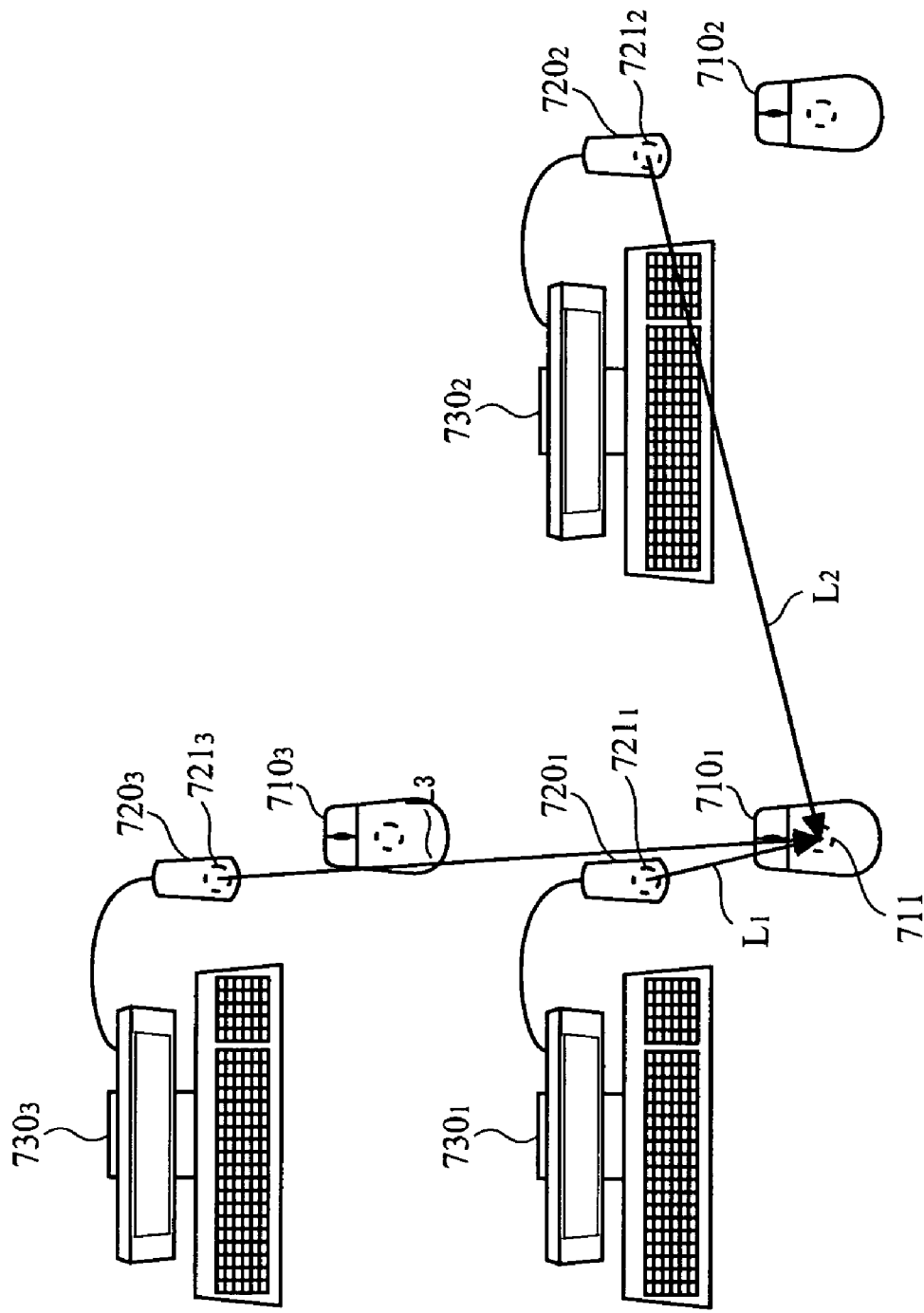
FIG. 28 is a top view illustrating a coordinate input device 700 in accordance with a seventh embodiment of the present invention.

FIG. 28 is a top view illustrating a coordinate input device 700 in accordance with the seventh embodiment of the present invention. Referring to FIG. 28, the coordinate input device 700 includes three PCs $730_1$, $730_2$, and $730_3$, three receiving units $720_1$, $720_2$, and $720_3$, and three pointing devices $710_1$, $710_2$, and $710_3$. The pointing device $710_1$ corresponds to the receiving unit $720_1$, and the receiving unit $720_1$ is connected to the PC $730_1$. The pointing device $710_2$ corresponds to the receiving unit $720_2$, and the receiving unit $720_2$ is connected to the PC $730_2$. The pointing device $710_3$ corresponds to the receiving unit $720_3$, and the receiving unit $720_3$ is connected to the PC $730_3$. The three pointing devices $710_1$, $710_2$, and $710_3$ and the three receiving units $720_1$, $720_2$, and $720_3$ send and receive data with the UWB signal.

A description will now be given of the receiving unit $720_1$ and the corresponding pointing device $710_1$, in particular. The PC $730_1$ and the receiving unit $720_1$ are connected via an interface such as USB, IEEE 1394, or the like. The receiving unit $720_1$ transmits a signal for distance measurement from the antenna $721_1$ regularly (for example, once every 30 milliseconds). The receiving units $720_2$ and $720_3$ also transmit signals for distance measurement from the antennas $721_2$ or $721_3$ regularly (for example once every 30 milliseconds). The pointing device $710_1$ receives the signals for distance measurement transmitted from the three receiving units $720_1$, $720_2$, and $720_3$, and detects respective propagation times. The pointing device $710_1$ respectively calculates propagation distances $L_1$, $L_2$, and $L_3$ of the signals for distance measurement, based on the detected propagation times. Position coordinates (x, y) of the pointing device unit $710_1$ are calculated with the propagation distances based on the principle of the triangular surveying. In the case where accurate propagation distances of all the signals for distance measurement are calculated, the pointing device $710_1$ needs to establish synchronization with all the receiving units $720_1$, $720_2$, and $720_3$ simultaneously. However, in order to calculate the amount of movement (x1−x0, y1−y0) in the end, reference position coordinates, instead of accurate ones, may be specified. In the seventh embodiment, the position coordinates (x, y) including an offset time (a time gap between the time of the pointing device $710_1$ and the receiving units $720_1$, $720_2$, and $720_3$) are calculated, and then the amount of movement are calculated based on a change of the above-mentioned position coordinates.

Figure 29:
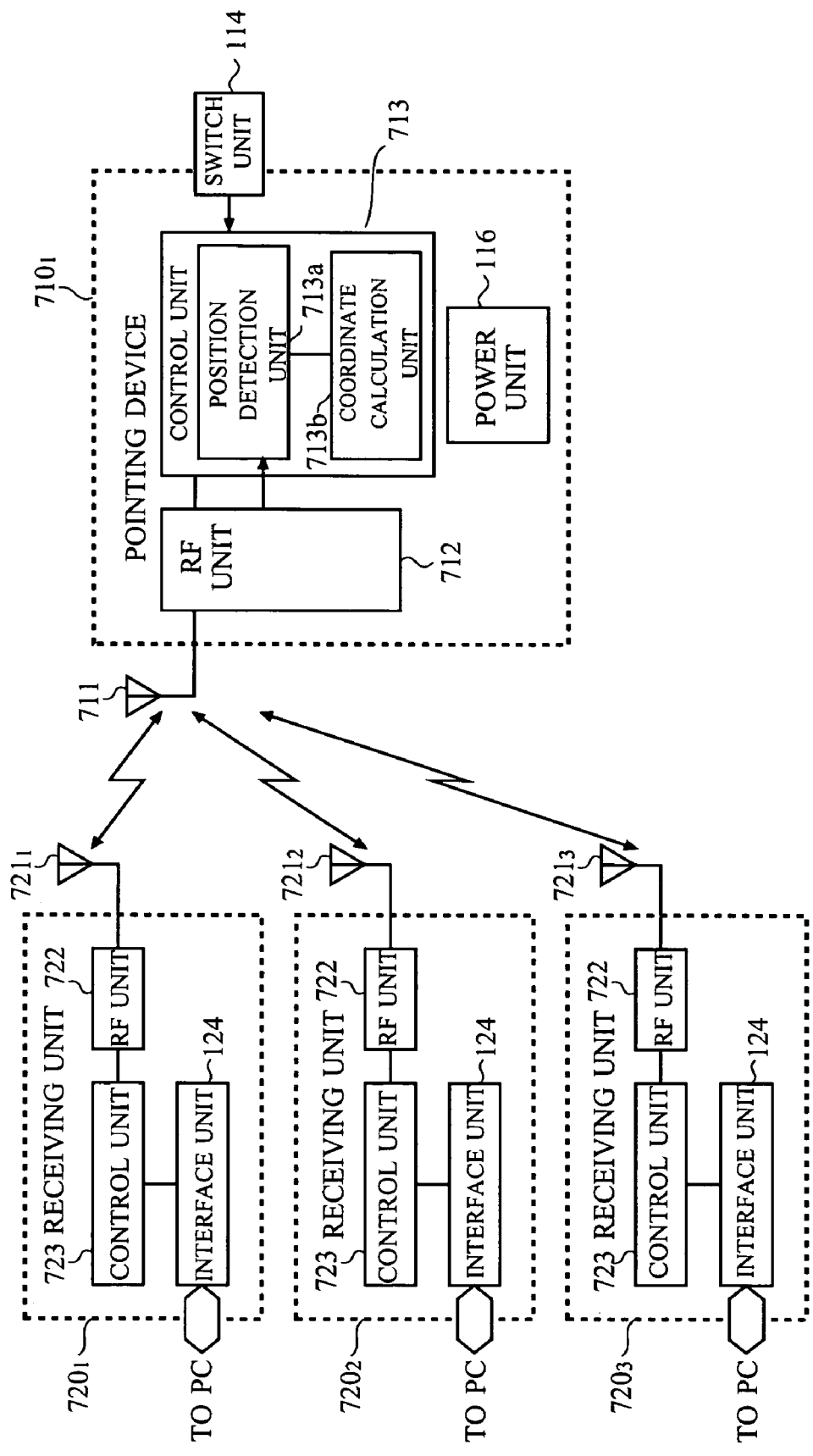
FIG. 29 is a block diagram showing system architecture of a pointing device $710_1$ and receiving units $720_1$, $720_2$, and $720_3$ in the seventh embodiment.

A description will now be given of the pointing device $710_1$ and the receiving unit $720_1$ with reference to FIG. 29. FIG. 29 is a block diagram showing system architecture of the pointing device $710_1$ and the receiving unit $720_1$ in the seventh embodiment. In FIG. 29, the pointing device $710_1$ is a mouse or a pen-type coordinate input device, for example, as in the first embodiment. The pointing device $710_1$ includes an antenna 711, an RF unit 712, a control unit 713, a switch unit 114, and a power unit 116. The power unit 116 includes a dry battery or the like so as to provide each unit with electricity. Operation information inputted from the switch unit 114 is inputted into the control unit 713. The control unit 713 performs a given process on the operation information, and inputs the information into the RF unit 712 as a data signal. The RF unit 712 spread spectrum modulates data with a preset spread spectrum code, and transmits this base band signal as a UWB signal without change from the antenna 711.

The receiving unit $720_1$ has an antenna $721_1$, an RF unit 722, a control unit 723, and an interface unit 124. The UWB signal received with the antenna $721_1$ is inputted into the RF control unit 722. The RF control unit 722 obtains the original data signal by spread spectrum demodulating the inputted UWB signal with a given spread spectrum code. The data signal is inputted into the control unit 723, and after a given process is carried out, the data signal is outputted into a PC from the interface unit 124. The receiving unit $720_2$ and has the same architecture, and sends and receives the data with the corresponding pointing devices $710_2$. The receiving unit $720_3$ and has the same architecture, and sends and receives the data with the corresponding pointing devices $710_3$.

The receiving units $720_1$, $720_2$, and $720_3$ regularly (for example, once every 30 milliseconds) transmit signals for distance measurement that can be received by any one of the pointing devices. In the seventh embodiment, a description will be given by taking the pointing device $710_1$, for example. The signal for distance measurement is a UWB signal that has been spread spectrum modulated with the spread spectrum code. The pointing device $710_1$ receives the above-mentioned three signals for distance measurement with the antenna 711. The three received signals for distance measurement are inputted into the RF unit 712, and are spread spectrum demodulated with the spread spectrum code generated at the each reception timing. By comparing the transmission timing with the reception timing, calculated is the propagation time until the three signals for distance measurement respectively reach the antenna 711. The transmission timings are the times when the signals are transmitted from the receiving units $720_1$, $720_2$, and $720_3$, and the reception timings are the times when those signals are received. However, as described, the above-mentioned propagation times include offset times. In the seventh invention, the offset times may be ignored.

The pointing device $710_1$ is capable of calculating distances $L_1$, $L_2$, and $L_3$ by multiplying a specified propagation time by the propagation speed. How to calculate the distances La, Lb, and Lc is the same as the first embodiment, a detailed explanation is omitted here. Also, the same as the first embodiment are how a position detection unit 713a calculates the position coordinates (x, y) with the calculated distances La, Lb, and Lc, based on the principle of the triangular surveying and how a coordinate calculation unit 713b calculates an amount of movement (x1−x0, y1−y0); therefore a detailed explanation is omitted here.

Figure 30A:
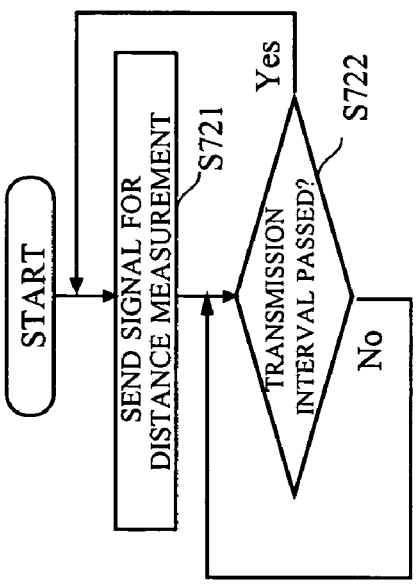
FIG. 30A is a flowchart describing the operations of the receiving units $720_1$, $720_2$, and $720_3$.
Figure 30B:
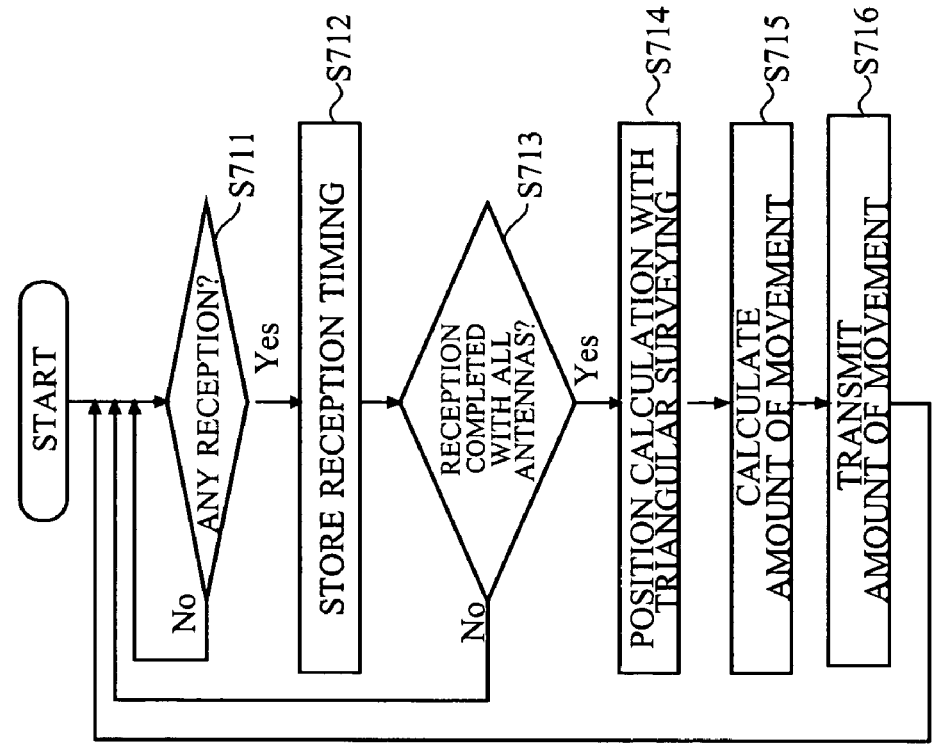
FIG. 30B is a flowchart describing the operations of the pointing device $710_1$.
Figure 30C:
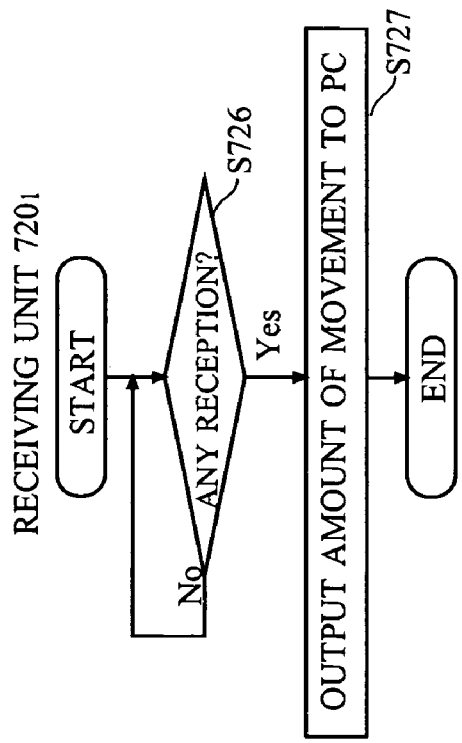
FIG. 30C is a flowchart describing the operations of the receiving unit $720_1$.

Next, a description will now be given of overall operations of the pointing device $710_1$ and the receiving units $720_1$, $720_2$, and $720_3$ with reference to FIGS. 30A through 30C. FIG. 30A is a flowchart describing the operations of the receiving units $720_1$, $720_2$, and $720_3$. FIG. 30B is a flowchart describing the operations of the pointing device $710_1$. FIG. 30C is a flowchart describing the operations of the receiving unit $720_1$.

The receiving units $720_1$, $720_2$, and $720_3$, after activated, transmit signals for distance measurement (step S721). Then receiving units $720_1$, $720_2$, and $720_3$ judge whether or not the preset transmission interval has passed (step S722). If the interval has passed (Yes in step S722), the receiving unit goes back to step S721 to transmit the signals for distance measurement.

In contrast, the pointing device $710_1$ judges whether or not the pointing device $710_1$ has received the signal for distance measurement from one of the receiving units $720_1$, $720_2$, and $720_3$ (step S711). If the pointing device $710_1$ has received the signal (Yes in step S711), the pointing device $710_1$ stores the reception timing (step S712). In addition, the pointing device $710_1$ also stores data for identifying the received receiving unit (one of the receiving units $720_1$, $720_2$, and $720_3$) after associating the data with the reception timing. This data is included in the signal for distance measurement.

Then, the pointing device $710_1$ judges whether or not the pointing device $710_1$ has received the signals for distance measurement transmitted from all the three receiving units $720_1$, $720_2$, and $720_3$ (step S713). If the pointing device $710_1$ has received all the three signals for distance measurement (Yes in step S713), the pointing device $710_1$ calculates the position coordinates based on the reception timing and the transmission timing (step S714). Also, the pointing device $710_1$ calculates the amount of movement (x1−x0, y1−y0) based on the position coordinates of last time (x0, y0) and the position coordinates of this time (x1, y1), and transmits the calculated amount of movement to the receiving unit $720_1$ (step S716). Then, the pointing device $710_1$ goes back to step S711 and waits for another reception. If the pointing device $710_1$ has not received all the signals for distance measurement (No in step S713), the pointing device $710_1$ goes back to step S711 and waits for another reception.

Referring to FIG. 30C, if the receiving unit $720_1$ receives the amount of movement (x1−x0, y1−y0) from the pointing device $710_1$ (Yes in step S726), the receiving unit $720_1$ outputs the amount of movement into a PC.

Above-mentioned operations enable to operate a pointer displayed on the display screen of the PC.

A description will now be given of an eighth embodiment, with reference to drawings. Hereinafter, in the eighth embodiment, the same components and configurations as those of the first embodiment have the same reference numerals and a detailed explanation will be omitted, if not otherwise specified.

In the eighth embodiment, a description will be given of another calculation method of the position coordinates (x, y) of the pointing device with the propagation time of the signal for distance measurement. The description will be given, with reference to the coordinate input device 100 in the first embodiment. The center of a triangle formed by the three antennas 111a, 111b, and 111c of the pointing device 110 is set to origins (0, 0).

Referring back to the first embodiment, in the case where the clocks of the pointing device 110 and the receiving unit 120 are not synchronized, when calculating the amount of movement of the pointing device 110, there are unknown values which are two-dimensional coordinates (X, Y) of the receiving unit 120 (antenna 121) and a time lag between the pointing device 110 and the receiving unit 120 (offset time: T). The unknown values are put X, Y, and Z in the eighth embodiment, and three equations are created based on the propagation paths of the signals for distance measurement. The unknown values are clarified by solving the equations.

In the case where the offset time T is considered a time lag made by the receiving unit 120, based on the time of the pointing device 110 with reference to the following formula 1, simultaneous equations in the following formula 2 can be created.

$$T = T_{120} - T_{110} \qquad \text{(Formula 1)}$$

$$L_a = c \times (t_{ra} - t_s + T) = \sqrt{(X-x_a)^2 + (Y-y_a)^2}$$

$$L_b = c \times (t_{rb} - t_s + T) = \sqrt{(X-x_b)^2 + (Y-y_b)^2}$$

$$L_c = c \times (t_{rc} - t_s + T) = \sqrt{(X-x_c)^2 + (Y-y_c)^2} \qquad \text{(Formula 2)}$$

In the formula 1, $T_{110}$ is the time of the pointing device 110, and $T_{120}$ is the time of the receiving unit 120. In the formula 2, c is the propagation speed of the signal for distance measurement. La is the propagation distance to the antenna 111a, Lb is the propagation distance to the antenna 111b, and Lc is the propagation distance to the antenna 111c. $t_{ra}$ is the reception timing of the antenna 111a, $t_{rb}$ is the reception timing of the antenna 111b, and $t_{rc}$ is the reception timing of the antenna 111c. $t_s$ is the transmission timing. (xa, ya) are position coordinates of the antenna 111a, (xb, yb) are position coordinates of the antenna 111b, and (xc, yc) are position coordinates of the antenna 111c. In the formulas, known values are c, $t_{ra}$, $t_{rb}$, $t_{rc}$, $t_s$, (xa, ya), (xb, yb) and (xc, yc).

By solving the three simultaneous equations, calculated are the position coordinates (X, Y) of the receiving unit 120 and the offset time T. Calculation processes are clear; therefore, a detailed explanation is omitted here.

$t_{ra}$, $t_{rb}$, $t_{rc}$, and $t_s$ are inputted into the position detection unit 113a. The position detection unit 113a creates the simultaneous equations in the formula 2, based on predetermined c, (xa, ya), (xb, yb), and (xc, yc), and inputted $t_{ra}$, $t_{rb}$, $t_{rc}$, and $t_s$, and then solves the equations. Thus, the position detection unit 113a calculates the position coordinates (X, Y) of the receiving unit 120. The position coordinates (x, y) of the pointing device 110 are obtained by calculating back the position coordinates (X, Y) of the receiving unit 120.

Then, the position detection unit 113a inputs the calculated position coordinates (x, y) into the coordinate calculation unit 113b. The coordinate calculation unit 113b calculates the amount of movement (x1−x0, y1−y0) as in the first embodiment, based on the position coordinates (x1, y1) inputted this time and the position coordinates (x0, y0) inputted the last time. The configurations and operations are same as those of the first embodiment and a detailed explanation is omitted.

The number of the unknown values can be reduced by caching the offset time T out of the calculated results of the above-mentioned simultaneous equations. Thus, the calculation processes can be simplified and the speed of the entire process can be increased.

Next, a description will now be given of a ninth embodiment. Hereinafter, in the ninth embodiment, the same components and configurations as those of the first embodiment have the same reference numerals and a detailed explanation will be omitted, if not otherwise specified.

In the ninth embodiment, a description will be given of another method of calculating the position coordinates of the pointing device (x, y) with the use of the propagation time of the signal for distance measurement. The description will be given, with reference to the coordinate input device 100 in the first embodiment.

In the case where accurate propagation distances of all the signals for distance measurement are calculated, the pointing device 110 needs to establish the synchronization with the receiving unit 120 simultaneously. However, reference position coordinates, instead of accurate position coordinates, may be specified in order to calculate the amount of movement (x1−x0, y1−y0) in the end. In the ninth embodiment, the pointing device 110 calculates the position coordinates (x, y) including the offset time, and calculates the amount of movement based on a change of the position coordinates. Thus, the process for synchronization in the first embodiment can be omitted (step S111 through step S121 in FIG. 6). The components and configurations are the same as those of the first embodiment and a detailed explanation is omitted here.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2003-357645 filed on Oct. 17, 2003 including specification, claims, drawings, and abstract is incorporated herein by reference in its entirety.

What is claimed is:

1. A handheld pointing device, comprising:
   a first unit that communicates with a receiving unit by Ultra Wide Band signals;
   a plurality of antennas that receive Ultra Wide Band signals regularly transmitted from the receiving unit;
   a second unit that is within a main body of the pointing device and that specifies reception timings of the Ultra Wide Band signals on an antenna basis;
   a third unit that specifies transmission timings of the Ultra Wide Band signals;
   a fourth unit that calculates propagation distances of the Ultra Wide Band signals, based on the reception timings and the transmission timings;
   a fifth unit that calculates position coordinates of the pointing device relative to the receiving unit with the propagation distances, based on a principle of triangular surveying; and
   a sixth unit that calculates an amount of movement of the pointing device, based on a difference between the position coordinates calculated at a last time and the position coordinates calculated at a current time.

2. The pointing device as claimed in claim 1, wherein the pointing device is a mouse.

3. The pointing device as claimed in claim 1, wherein the pointing device is a pen-like coordinate input device.

* * * * *